United States Patent [19]

Blythe et al.

[11] Patent Number: 4,845,154

[45] Date of Patent: Jul. 4, 1989

[54] COPOLYMERS OF AROMATIC VINYL COMPOUNDS AND CONJUGATED DIOLEFINS HAVING SUBSTANTIAL INCREASE IN AROMATIC VINYL COMPOUND DIFFERENTIAL CONTENT

[75] Inventors: Robert J. Blythe, Yardley; Robert Bond, Lichfield, both of England; Gerardus E. La Heij, Amsterdam, Netherlands

[73] Assignee: Shell Internationale Research Maatschappij B.V., The Hague, Netherlands

[21] Appl. No.: 524,019

[22] Filed: Aug. 17, 1983

Related U.S. Application Data

[62] Division of Ser. No. 239,514, Mar. 2, 1981, abandoned.

[30] Foreign Application Priority Data

| Mar. 7, 1980 | [GB] | United Kingdom | 8007861 |
| Mar. 7, 1980 | [GB] | United Kingdom | 8007860 |
| Nov. 29, 1980 | [GB] | United Kingdom | 80038406 |
| Nov. 29, 1980 | [GB] | United Kingdom | 80038405 |
| Feb. 20, 1981 | [GB] | United Kingdom | 8105433 |

[51] Int. Cl.$^4$ ............... C08L 25/02; C08L 25/10; C08L 53/02

[52] U.S. Cl. ............... 525/237; 525/192; 525/194; 525/196; 526/340

[58] Field of Search ............... 525/192, 194, 196, 237; 526/340

[56] References Cited

U.S. PATENT DOCUMENTS

| 3,402,159 | 9/1968 | Hsieh . |
| 3,953,543 | 4/1976 | Futamura et al. . |
| 4,104,332 | 8/1978 | Zelinski ............... 525/194 |
| 4,105,714 | 8/1978 | Trepka et al. ............... 525/192 |
| 4,334,567 | 6/1982 | Bond . |

FOREIGN PATENT DOCUMENTS

| 823590 | 6/1975 | Belgium . |
| 871073 | 4/1979 | Belgium . |
| 0054911 | 6/1982 | European Pat. Off. . |
| 1457023 | 11/1965 | Fed. Rep. of Germany . |
| 1905422 | 8/1969 | Fed. Rep. of Germany . |
| 1520548 | 2/1970 | Fed. Rep. of Germany . |
| 1945884 | 3/1970 | Fed. Rep. of Germany . |
| 2247470 | 4/1973 | Fed. Rep. of Germany . |
| 2357911 | 6/1974 | Fed. Rep. of Germany . |
| 2418772 | 11/1974 | Fed. Rep. of Germany . |
| 2630568 | 1/1977 | Fed. Rep. of Germany . |
| 2256185 | 7/1975 | France . |
| 903331 | 8/1962 | United Kingdom . |
| 1136189 | 12/1968 | United Kingdom . |
| 1203063 | 8/1970 | United Kingdom . |
| 1212386 | 11/1970 | United Kingdom . |
| 1231657 | 5/1971 | United Kingdom . |
| 1331521 | 9/1973 | United Kingdom . |
| 1387920 | 3/1975 | United Kingdom . |
| 1396431 | 6/1975 | United Kingdom . |
| 1415718 | 11/1975 | United Kingdom . |
| 1461373 | 1/1977 | United Kingdom . |
| 1496359 | 12/1977 | United Kingdom . |

OTHER PUBLICATIONS

Plaste und Kautschuk, Paper of Gomoll and Seide, 16 JG, H.6, 1969 S 412-415.

*Primary Examiner*—Allan M. Lieberman
*Attorney, Agent, or Firm*—Stevens, Davis, Miller & Mosher

[57] ABSTRACT

There is disclosed copolymers of aromatic vinyl compounds, e.g., styrene, and conjugated diolefins, e.g., butadiene, possessing a differential content of the aromatic vinyl compound such that in at least one of the end portions of the copolymer the differential content shows a sharp and substantial increase in the direction of the outer extremity of the end portion. Preferred copolymers are styrene-butadiene copolymers having a vinyl content of at least 30%. In special embodiments, the copolymers have a styrene content changing in a portion of no more than 5% of the copolymer chain from a first value to a second value, the second value being at least 25 percentage points greater than the first value, and the portion is present within a 10% terminal portion of the copolymer. The copolymers are useful in the tread portions of tires as tires containing such copolymers in the tread composition have improved rolling resistance and/or grip on wet road surfaces.

17 Claims, 28 Drawing Sheets

COPOLYMERS OF AROMATIC VINYL COMPOUNDS AND CONJUGATED DIOLEFINS HAVING SUBSTANTIAL INCREASE IN AROMATIC VINYL COMPOUND DIFFERENTIAL CONTENT

This is a division of application Ser. No. 239,514 filed Mar. 2, 1981 now abandoned.

This invention relates broadly to elastomeric copolymers of conjugated dienes and aromatic vinyl compounds, having novel structures and to processes of making them, to unvulcanised and vulcanised elastomeric compositions containing them and to their use in tires, in particular in the tread portion of tires. The invention is particularly concerned with copolymers derived from a styrene and a butadiene, for example styrene and 1,3-butadiene, and it is with reference to such polymers that the description hereinafter particularly relates.

The novel structure of the copolymers of this invention can be defined with reference to the distribution of the styrene or other aromatic vinyl compound in the copolymer molecule. For example, if the proportion of styrene in successive incremental portions of the molecule (differential styrene content) is plotted against total monomer conversion (expressed as a percentage of the monomers reacting to form copolymer) there is obtained a line with represents the respective amounts of styrene present along the length of the molecule. By way of comparison, a graph of this sort in respect of a true random copolymer having, for example, an average styrene content of 23% by weight is a straight horizontal line indicating that the styrene content of successive incremental portions of the molecule is substantially 23% throughout.

We have found, according to the present invention, that the properties of wet grip and/or rolling resistance of tires whose tread comprises a styrene-butadiene copolymer are significantly improved if the copolymer is one having in at least one of its end portions of the molecule a significant styrene-rich component or zone such as is shown in the accompanying drawings.

BRIEF DESCRIPTION OF THE DRAWINGS

The drawings designated as PRINT 1, PRINT 2, PRINT 3, PRINT 4, PRINT 6, PRINT 7, PRINT 8, PRINT 9, PRINT 10, PRINT 11/12, PRINT 13, PRINT 14,14A,15 & 16, PRINT 16B, PRINT 16C, PRINT 16D, PRINT 17, PRINT 18, PRINT 19, PRINT 20, PRINT 21, PRINT 22, PRINT 23, PRINT 24, PRINT 26, PRINT 27, PRINT 28, PRINT 35/36, and PRINT 37 correspond to the Experiments correspondingly numbered in the specification. There are no print numbers 5, 25, and 29-34. The drawings show the differential styrene content of the copolymers produced in accordance with the correspondingly numbered experiments.

Figure 1:
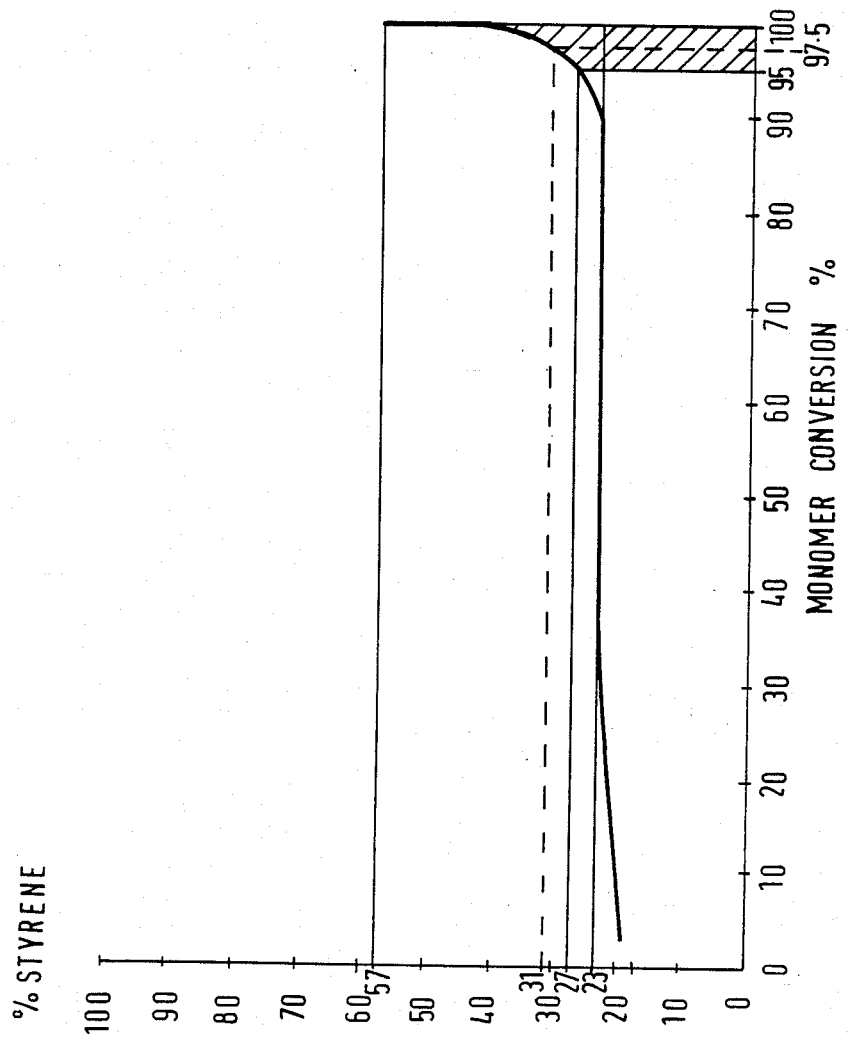
FIG. 1 illustrates Print 1.
Figure 2:
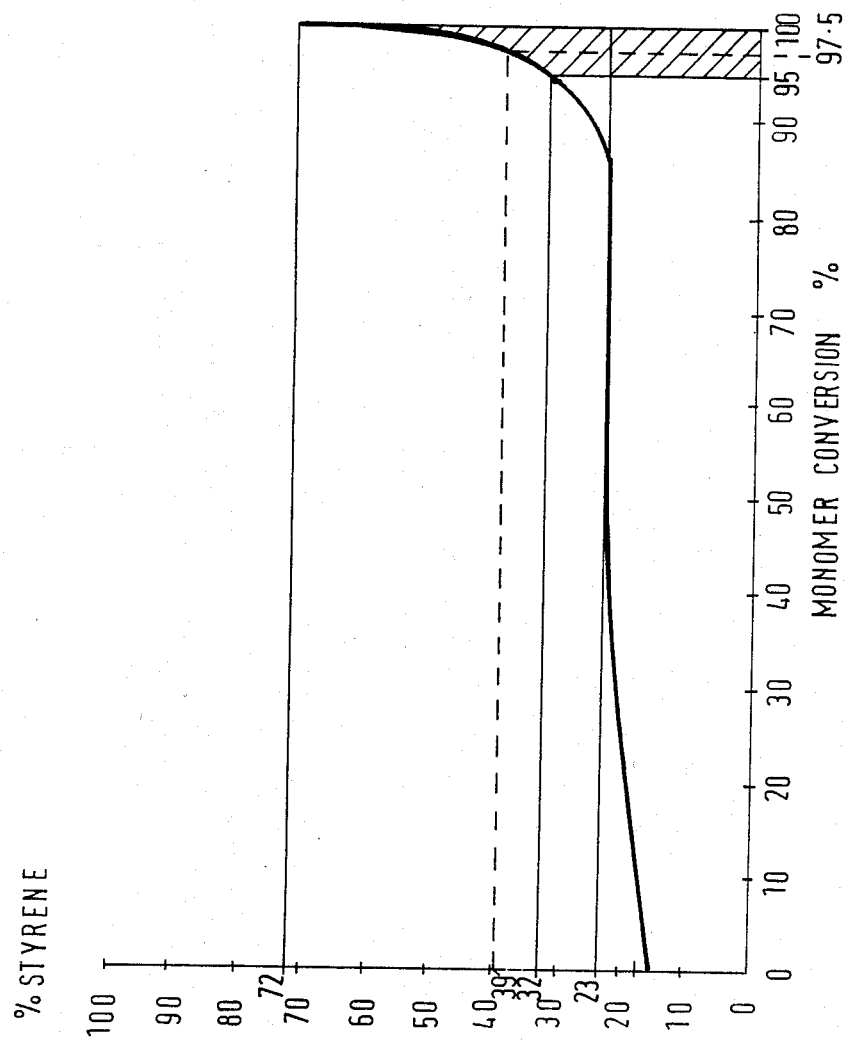
FIG. 2 illustrates Print 2.
Figure 3:
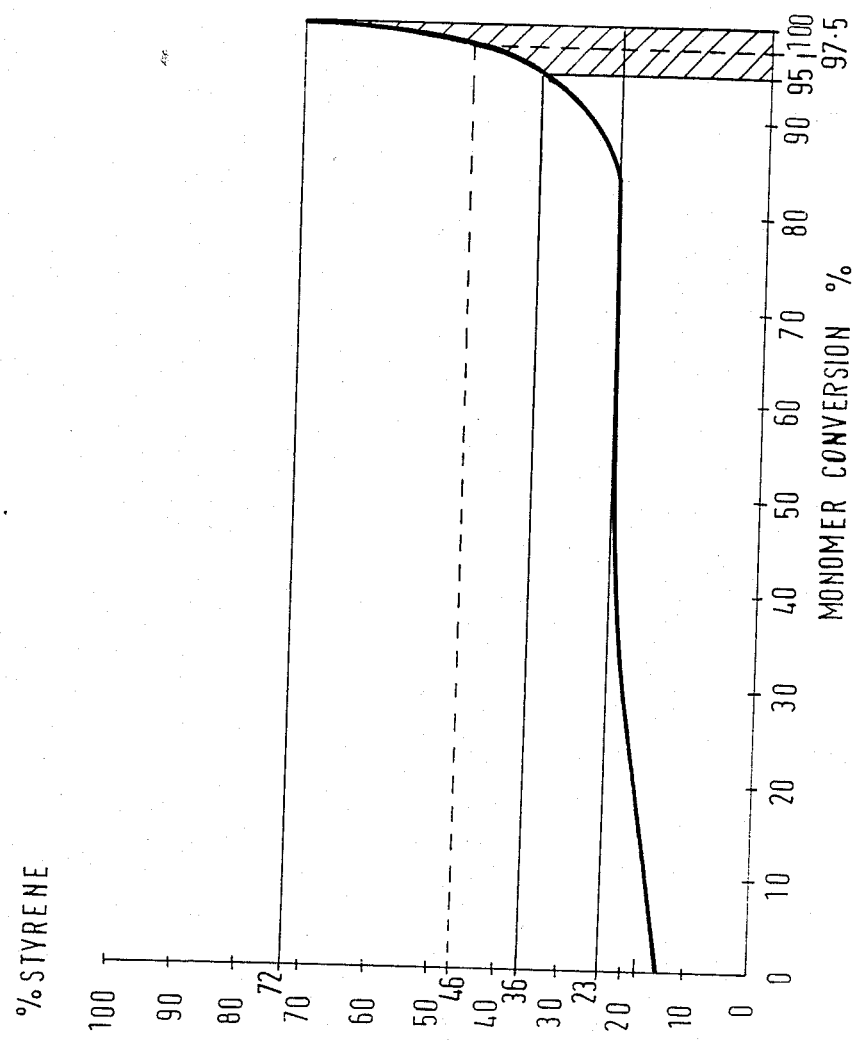
FIG. 3 illustrates Print 3.
Figure 4:
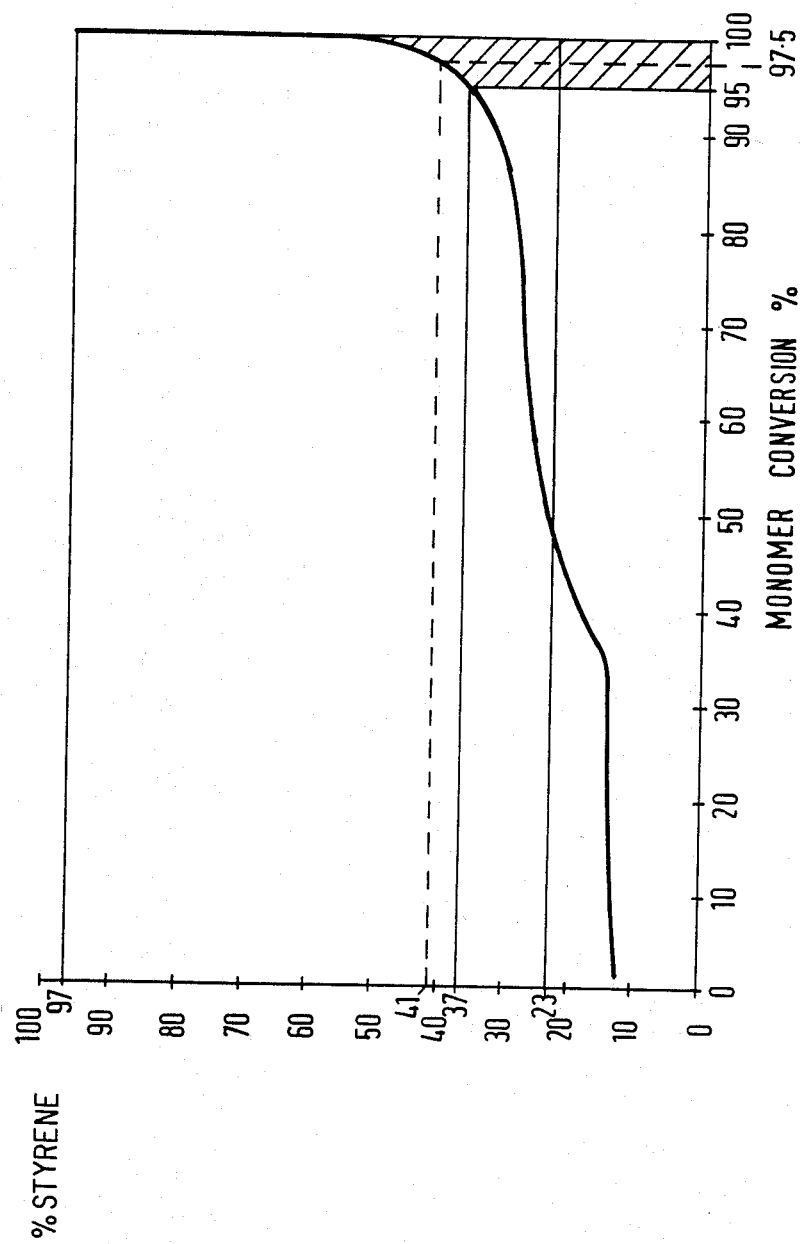
FIG. 4 illustrates Print 4.
Figure 5:
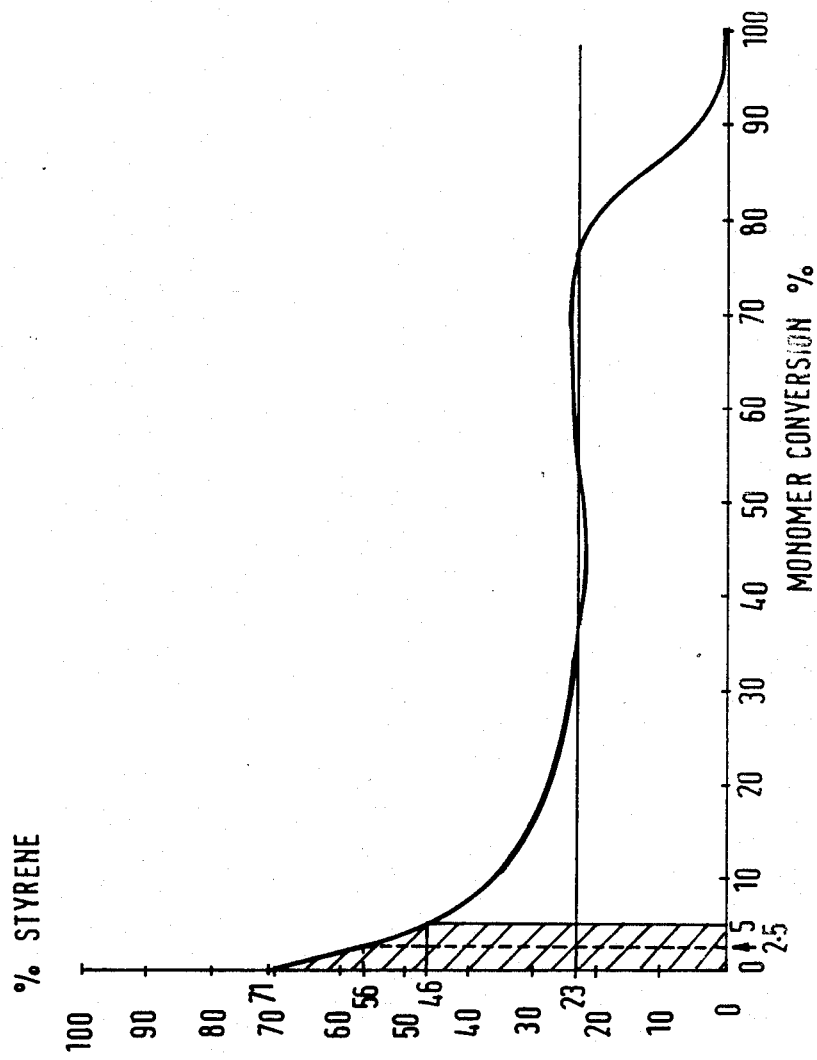
FIG. 5 illustrates Print 6.
Figure 6:
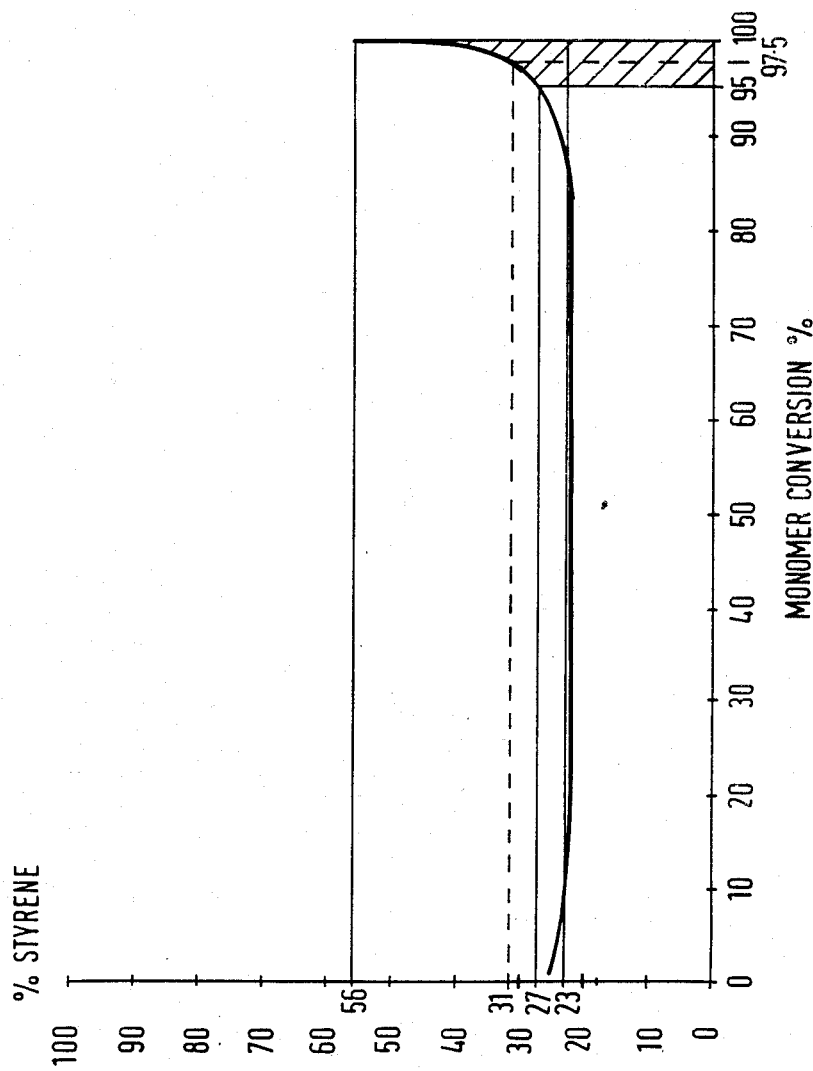
FIG. 6 illustrates Print 7.
Figure 7:
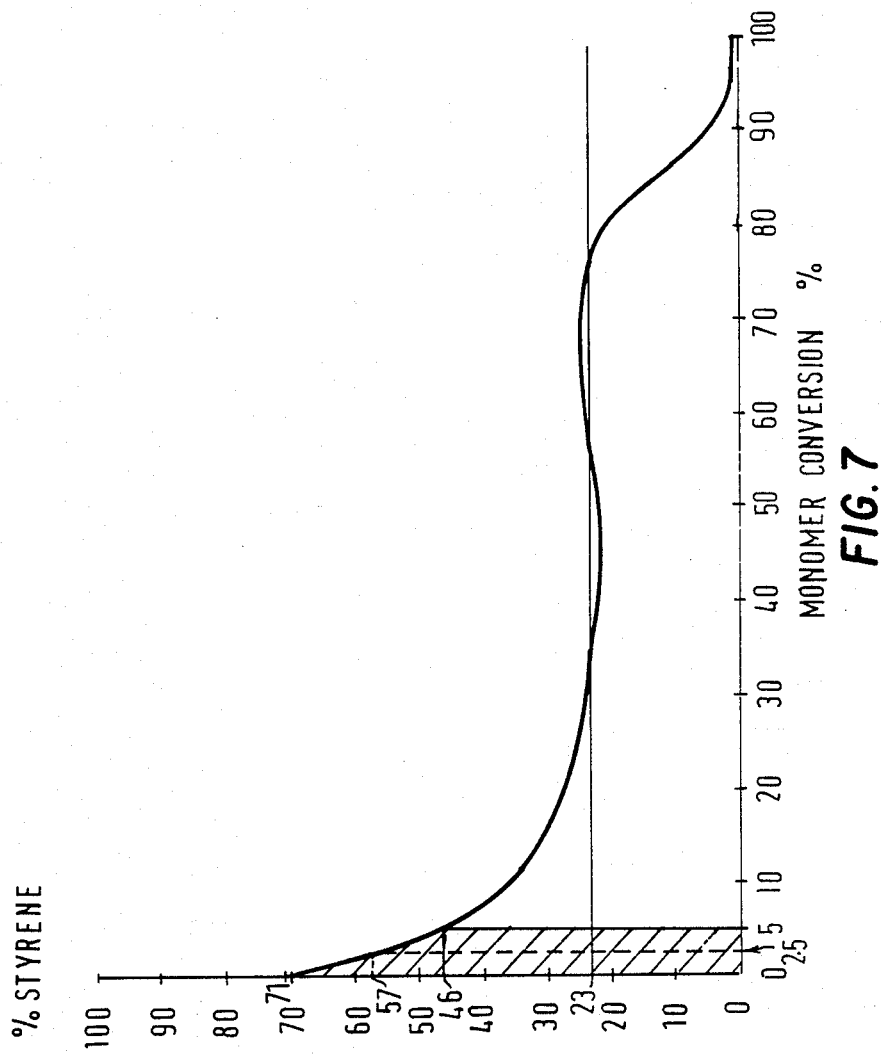
FIG. 7 illustrates Print 8.
Figure 8:
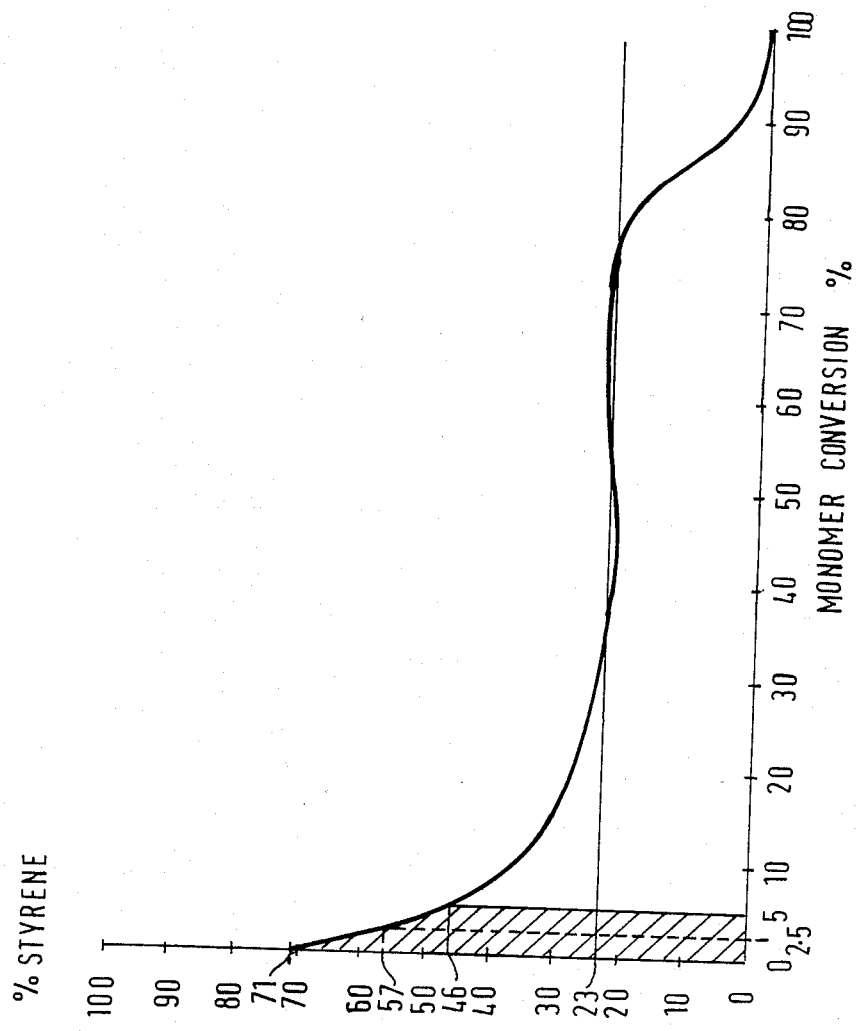
FIG. 8 illustrates Print 9.
Figure 9:
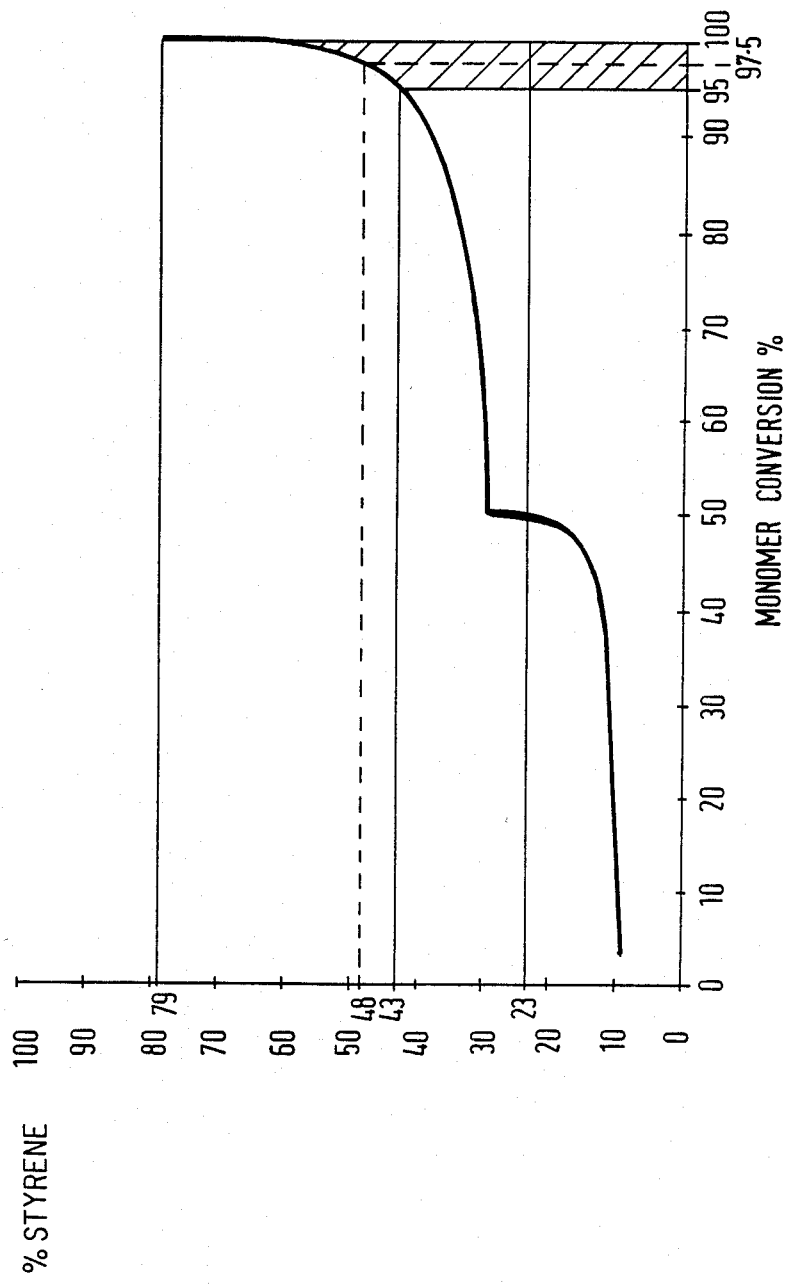
FIG. 9 illustrates Print 10.
Figure 10:
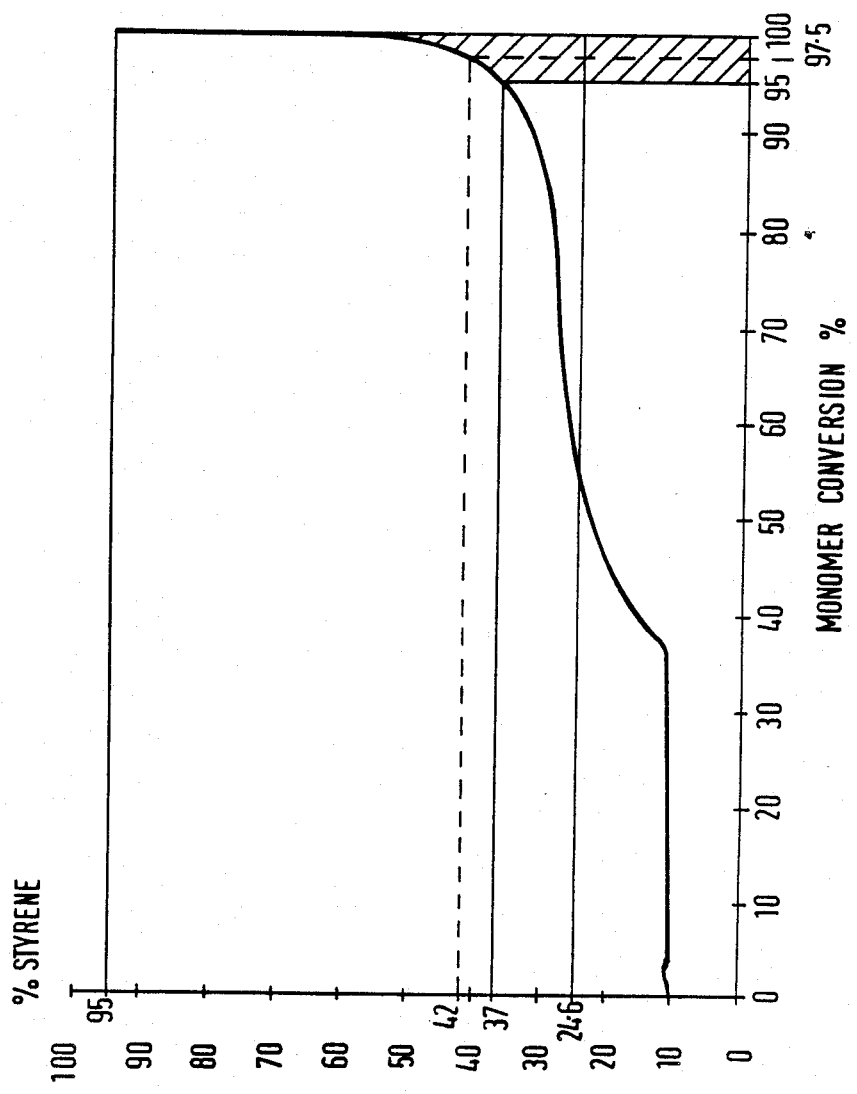
FIG. 10 illustrates Print 11/12.
Figure 11:
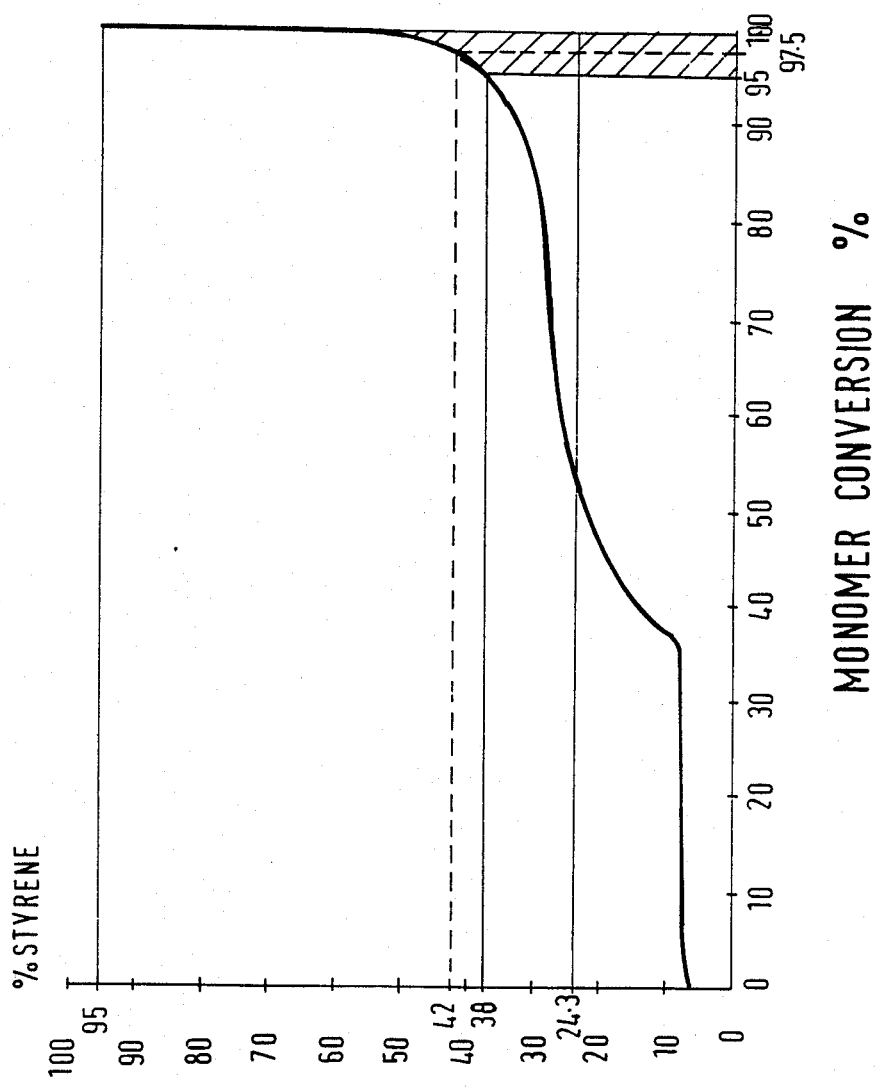
FIG. 11 illustrates Print 13.
Figure 12:
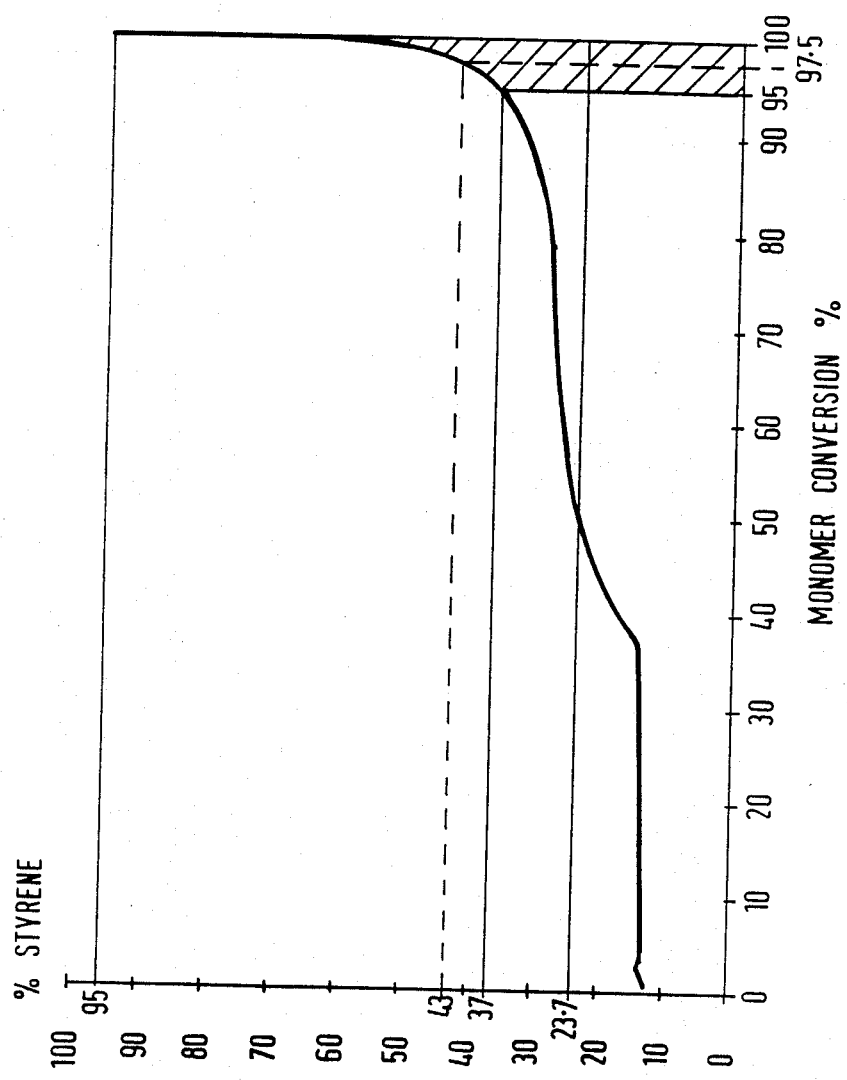
FIG. 12 illustrates Print 14, 14A, 15 and 16.
Figure 13:
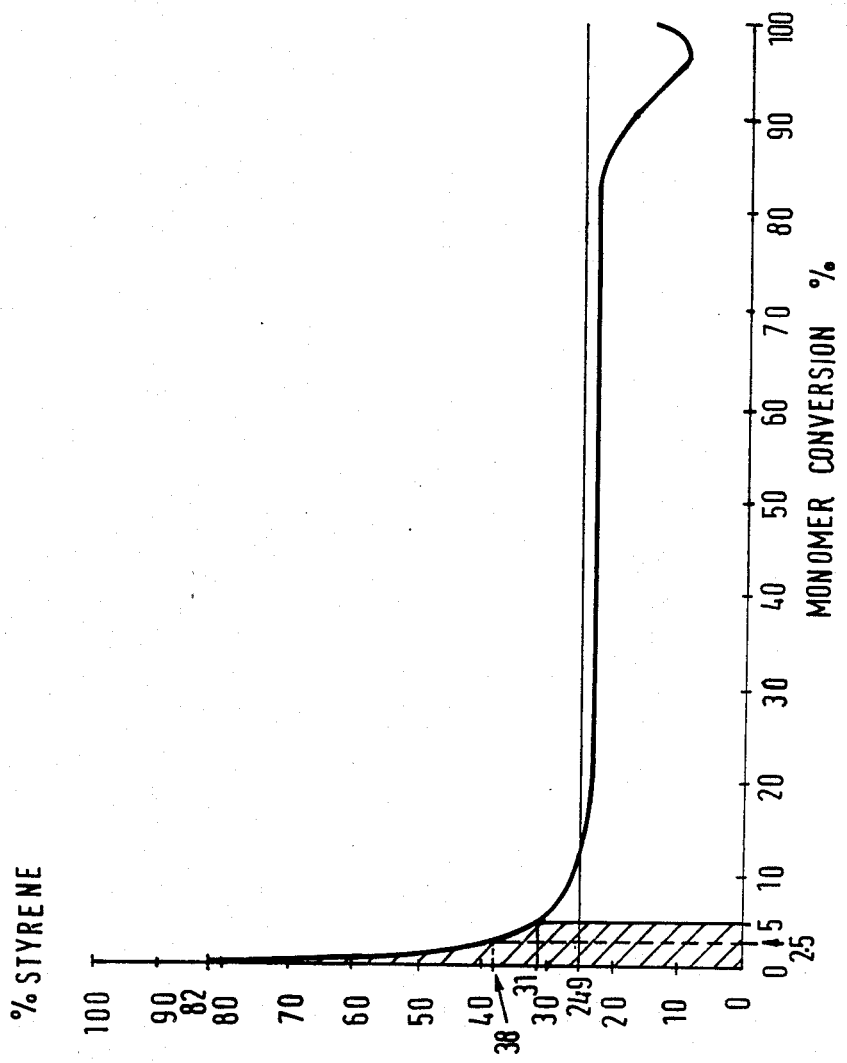
FIG. 13 illustrates Print 16B.
Figure 14:
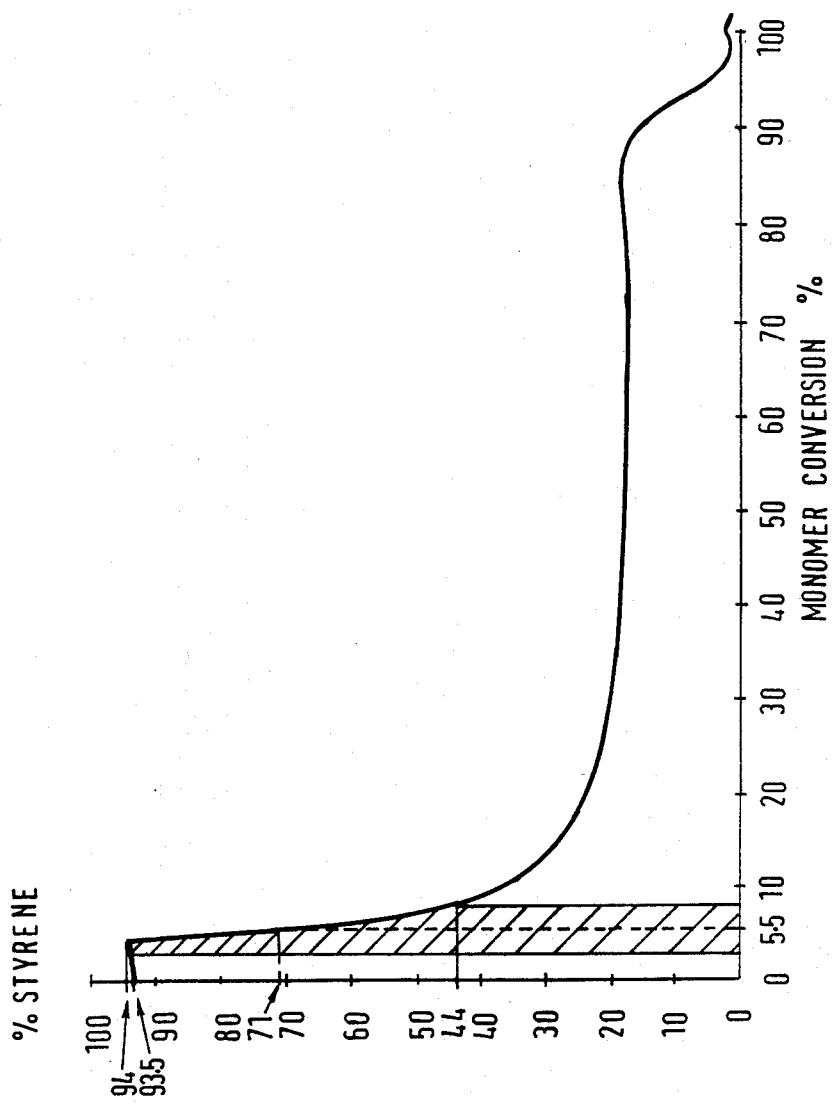
FIG. 14 illustrates Print 16C.
Figure 15:
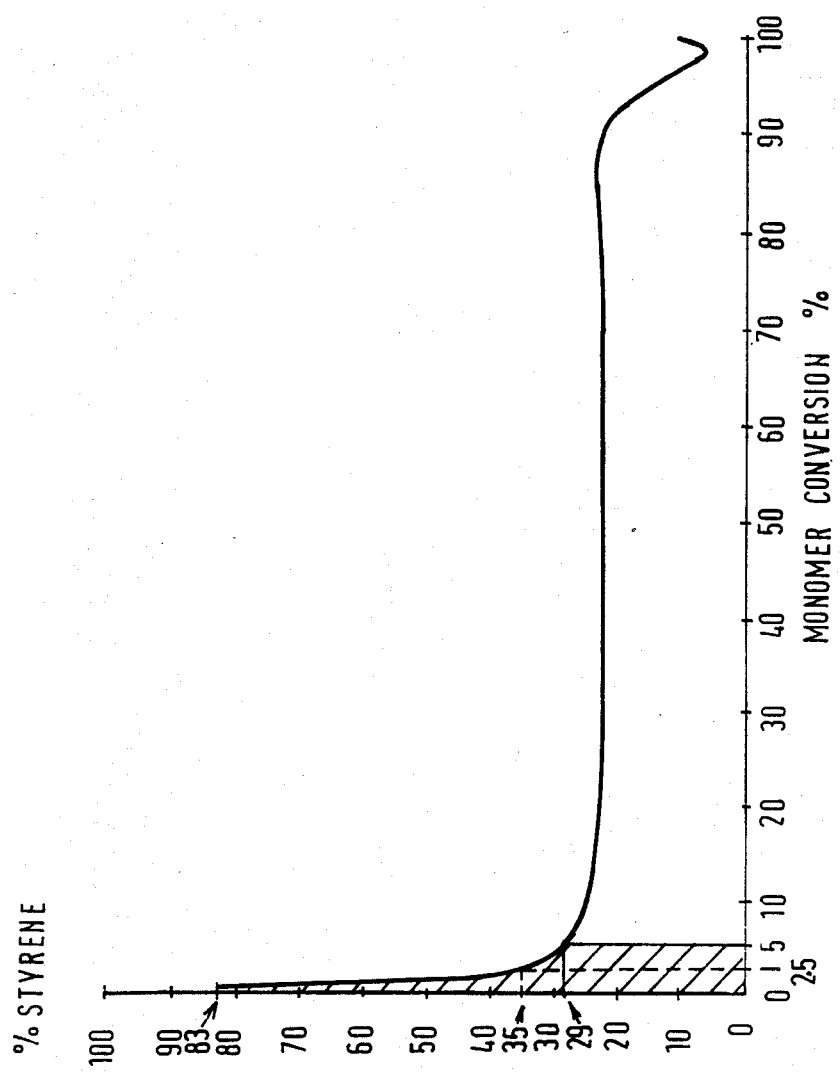
FIG. 15 illustrates Print 16D.
Figure 16:
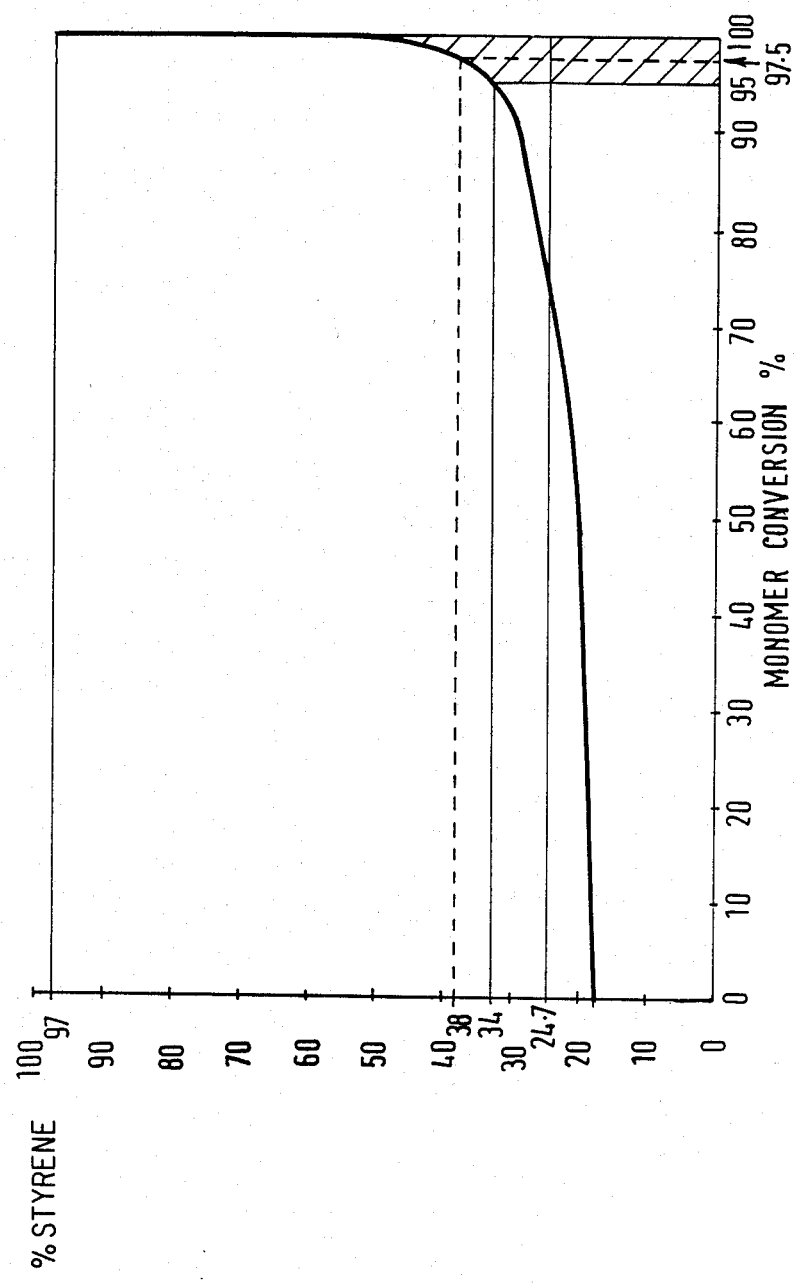
FIG. 16 illustrates Print 17.
Figure 17:
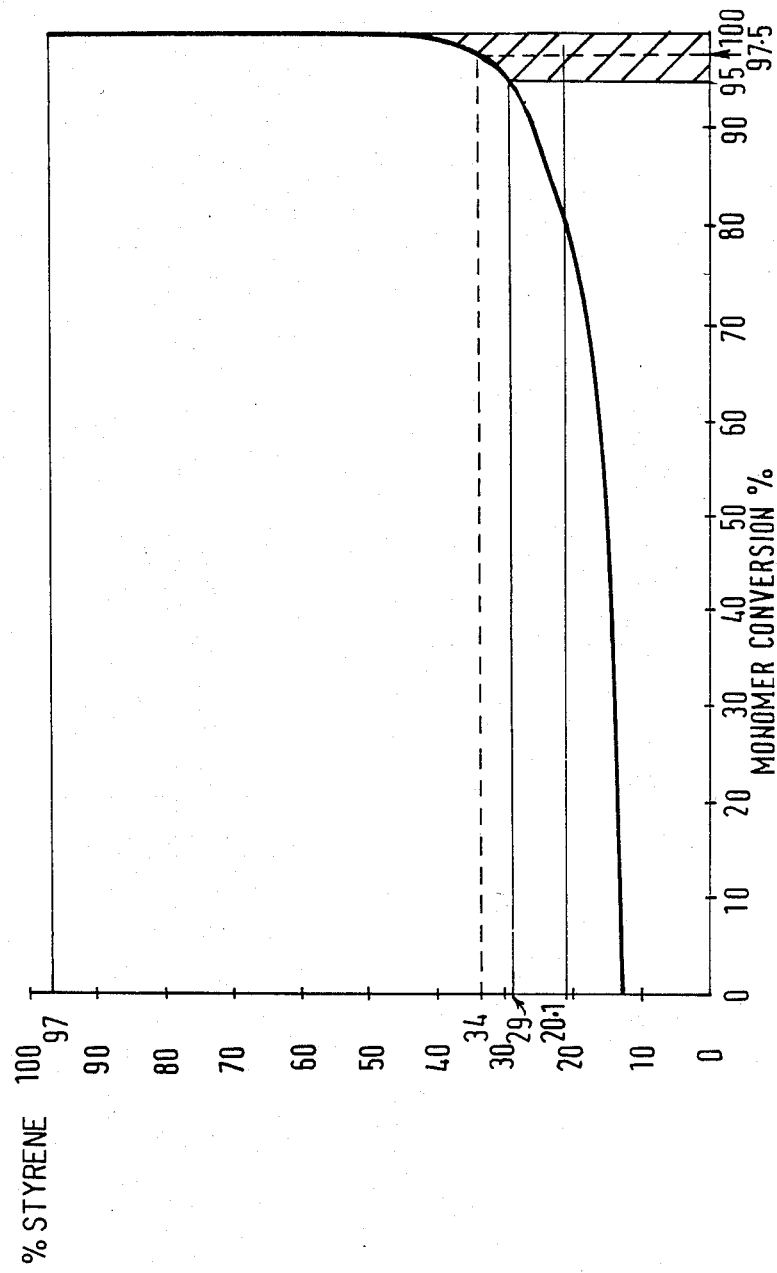
FIG. 17 illustrates Print 18.
Figure 18:
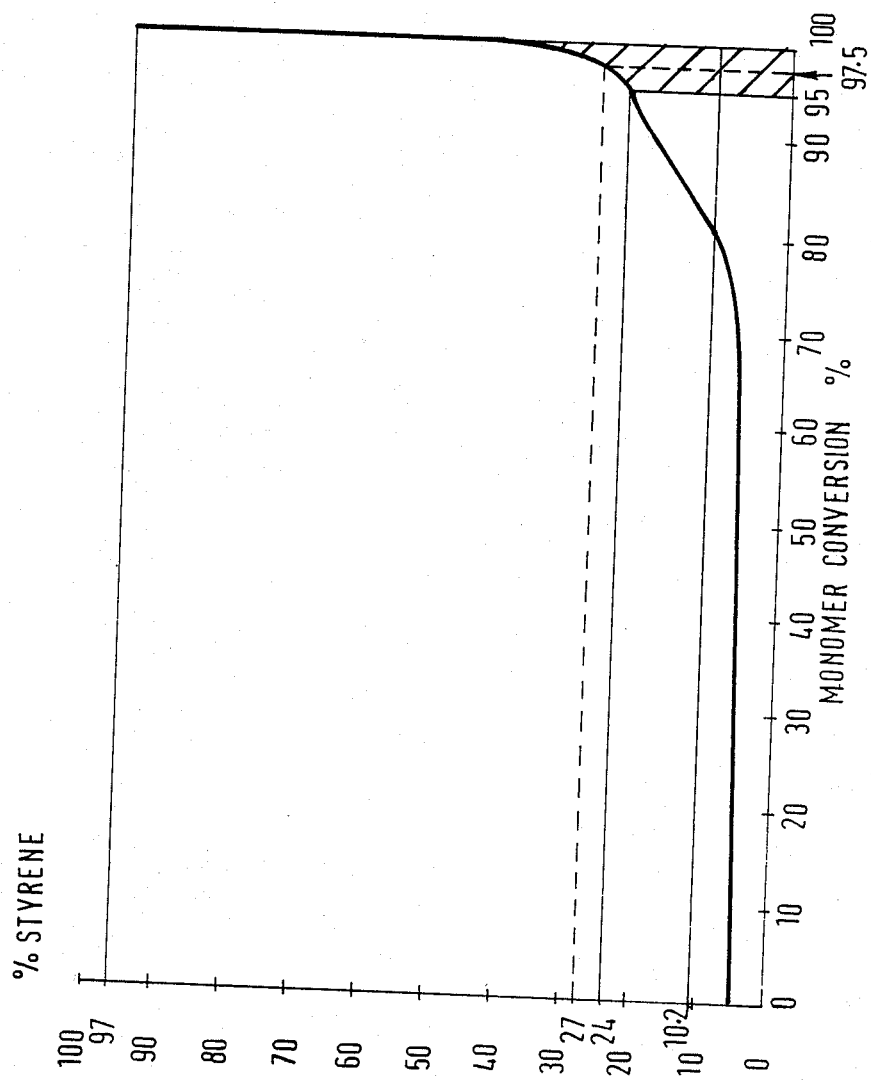
FIG. 18 illustrates Print 19.
Figure 19:
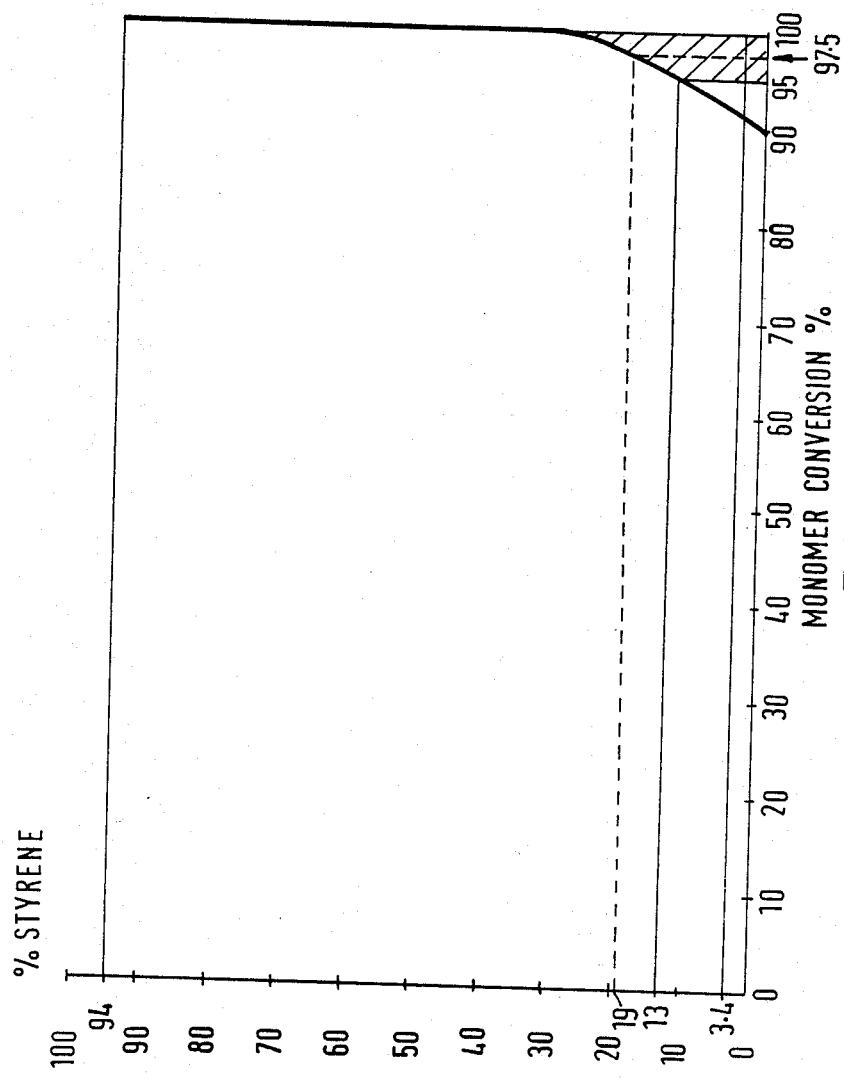
FIG. 19 illustrates Print 20.
Figure 20:
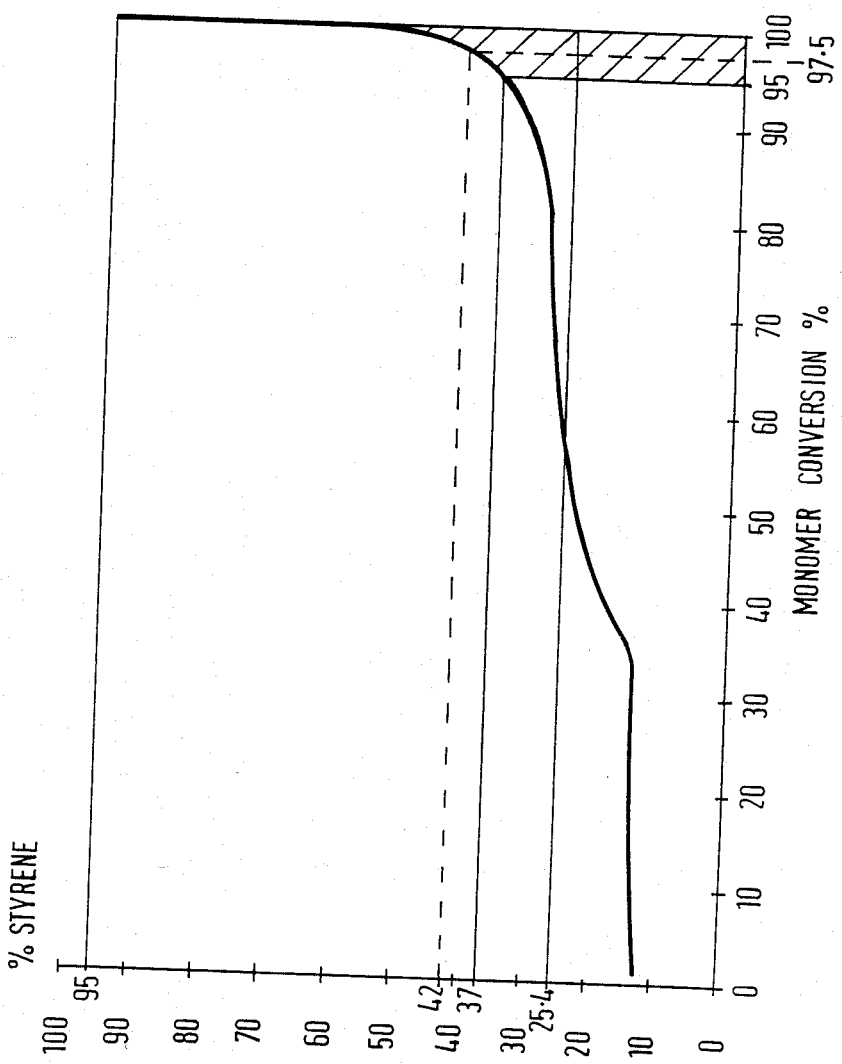
FIG. 20 illustrates Print 21.
Figure 21:
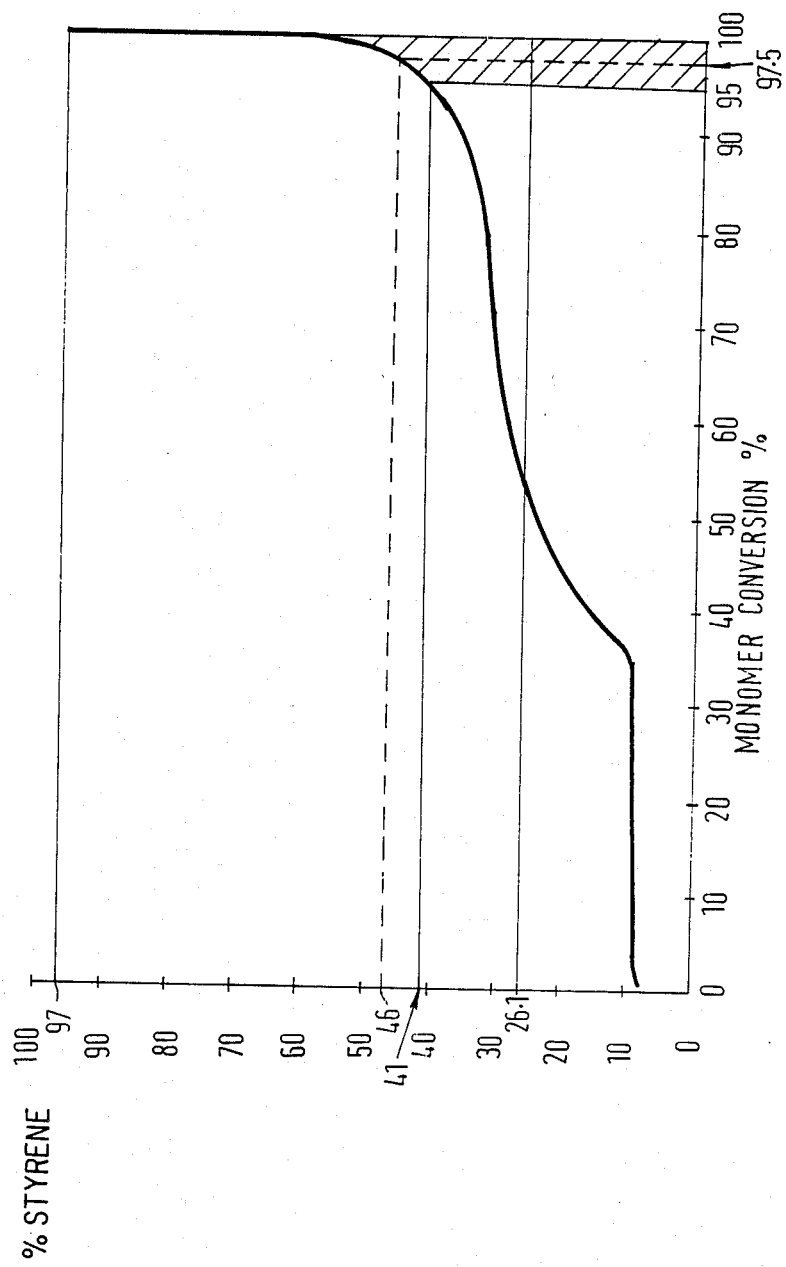
FIG. 21 illustrates Print 22.
Figure 22:
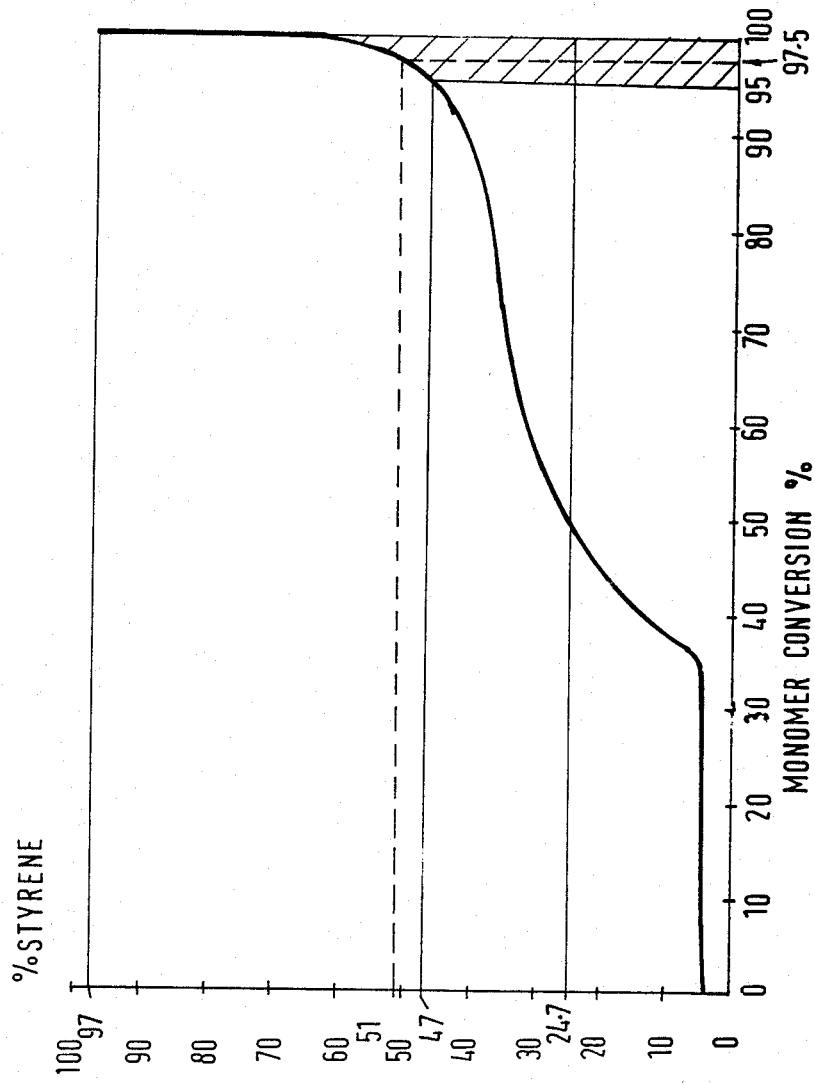
FIG. 22 illustrates Print 23.
Figure 23:
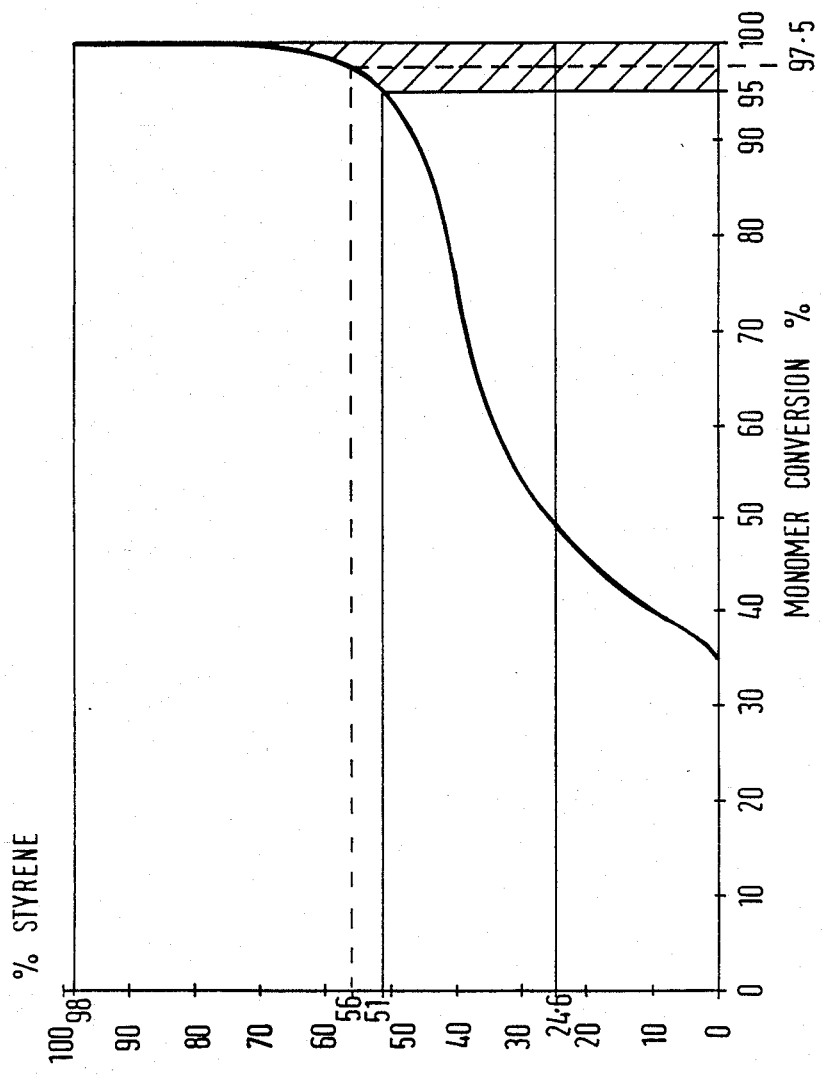
FIG. 23 illustrates Print 24.
Figure 24:
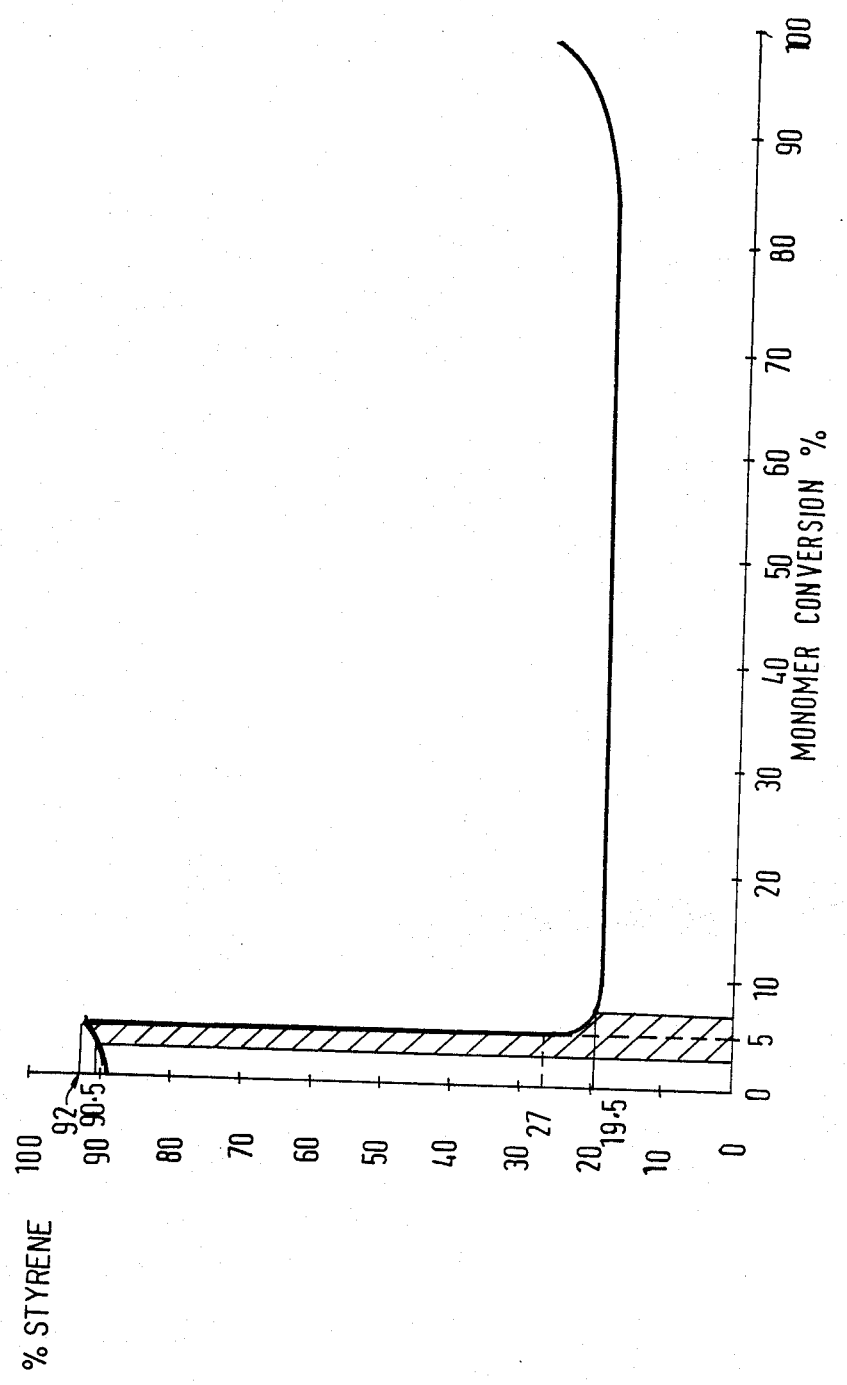
FIG. 24 illustrates Print 26.
Figure 25:
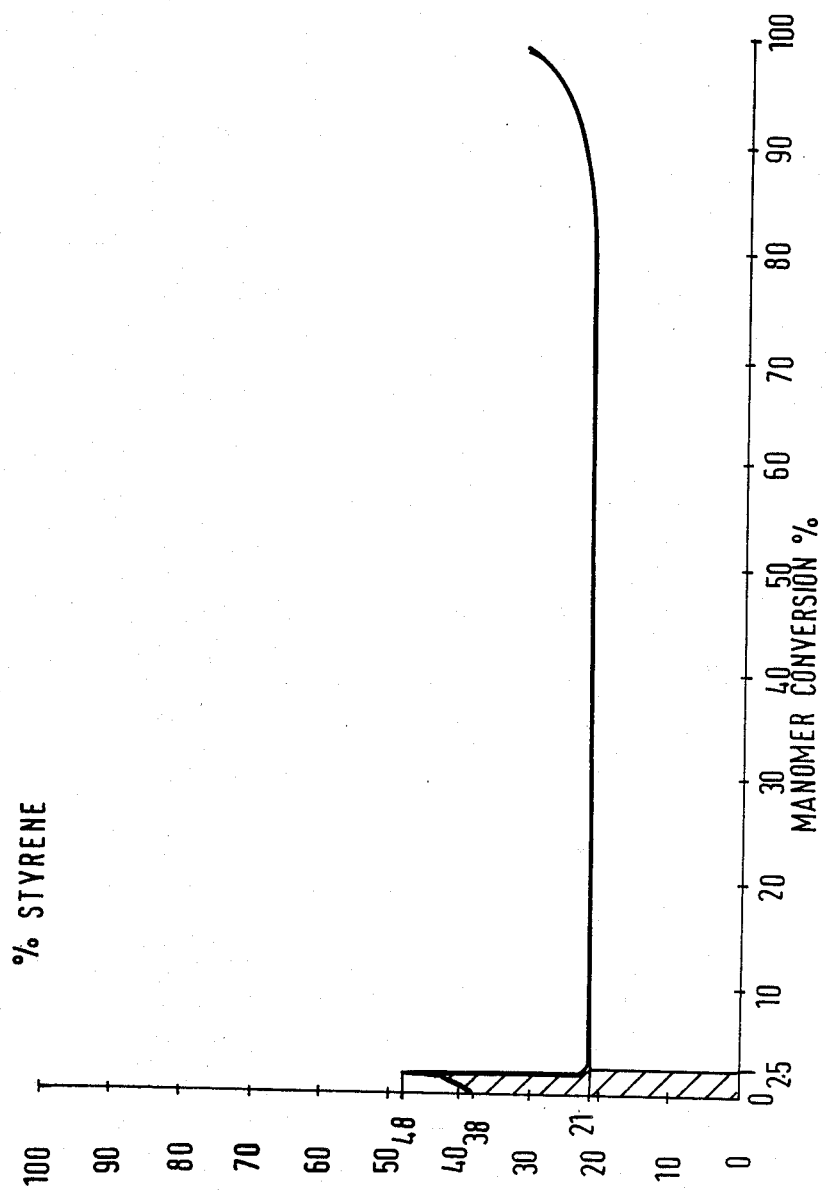
FIG. 25 illustrates Print 27.
Figure 26:
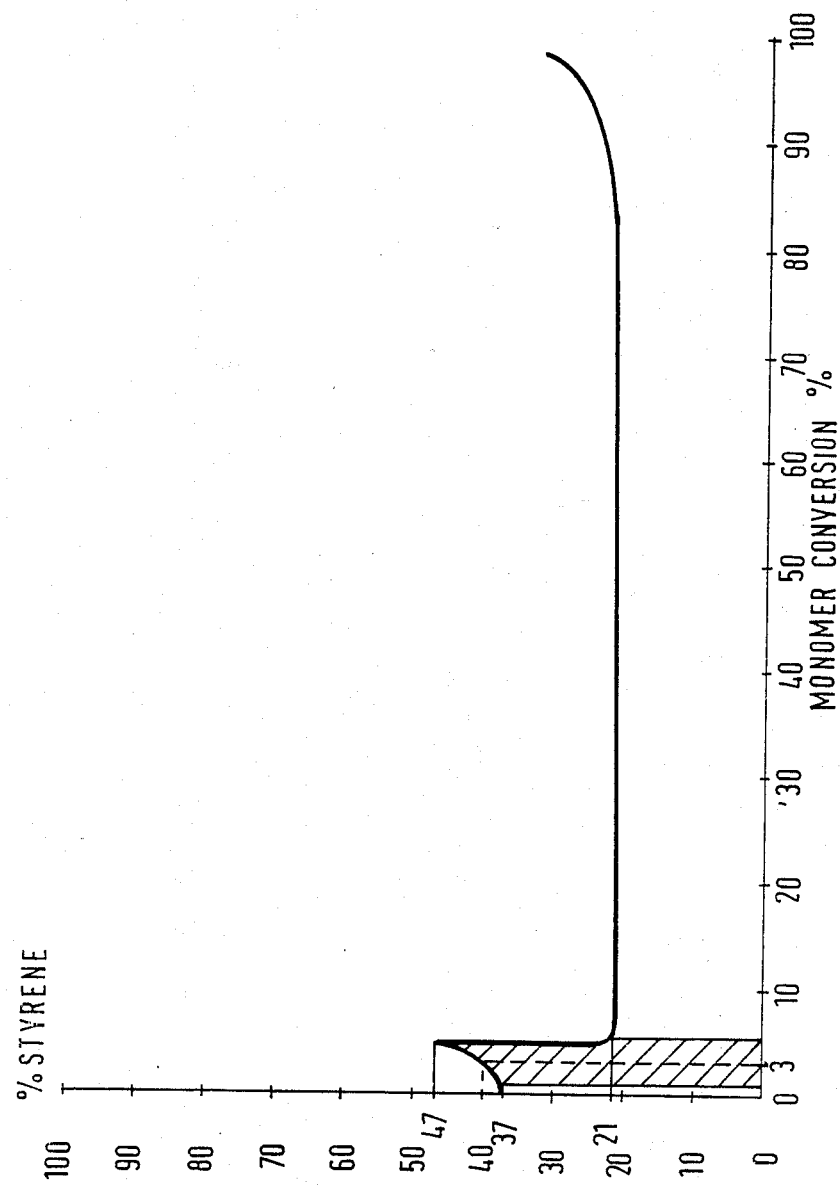
FIG. 26 illustrates Print 28.
Figure 27:
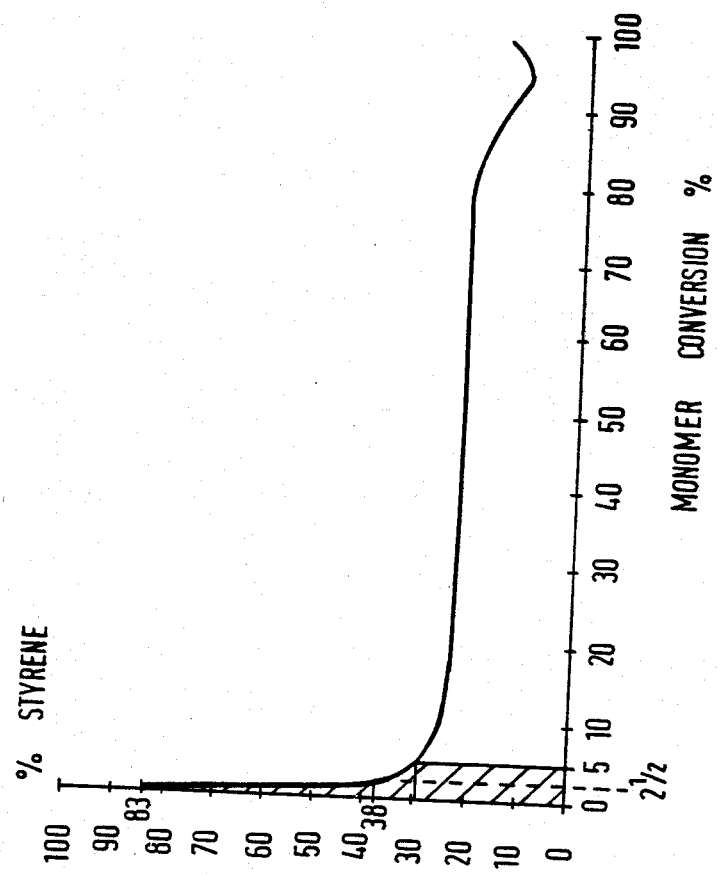
FIG. 27 illustrates Print 35/36.
Figure 28:
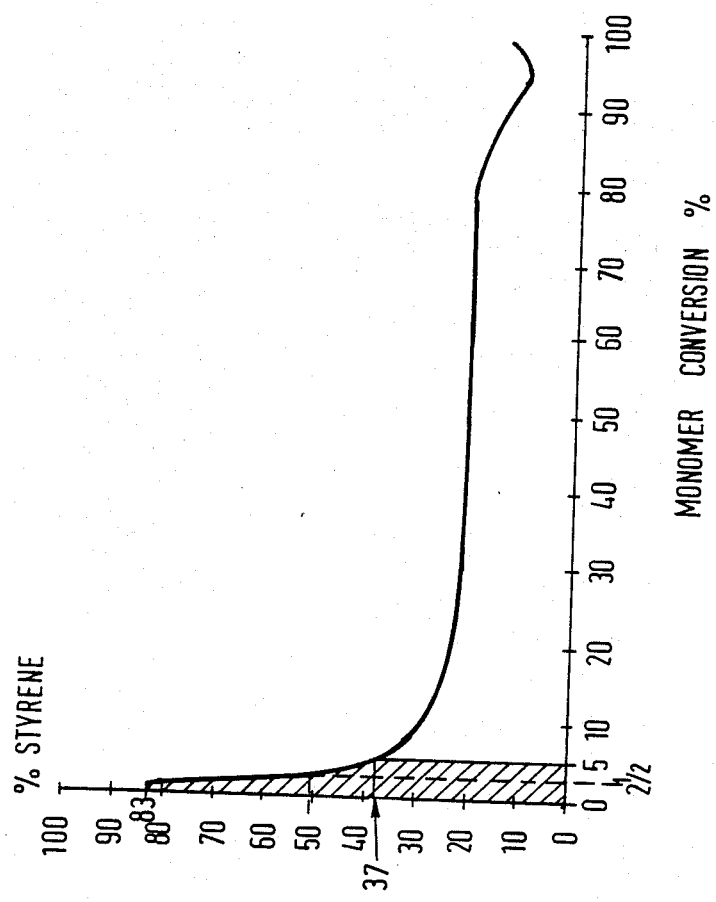
FIG. 28 illustrates Print 37.

The styrene-rich component can be considered to have two dimensions: length (that is, the proportion it constitutes of the total length or size of the molecule) and height (that is, the maximum differential styrene content in said end portion). In general, it appears that the more important feature is the maximum differential styrene content occurring in the end portion and especially where this maximum is reached over a shorter rather than a longer length of the end portion.

Accordingly, a first aspect of the present invention provides an elastomeric copolymer of an aromatic vinyl compound and a conjugated diene, suitable for use in the tread portion of a pneumatic tire, said copolymer having a vinyl content (as herein defined) of at least 30% by weight and having a differential content of the aromatic vinyl compound such that in at least one of its end portions said differential content shows a sharp and substantial increase in the direction of the outer extremity of said end portion.

In a second aspect the invention provides an elastomeric copolymer suitable for use in the tread portion of a pneumatic tire, whose percentage differential styrene content changes in a portion of not more than 5% of the copolymer chain (as determined by monomer conversion) from a first value to a second value, said second value being at least 25 percentage points greater than said first value; and said portion lies within a terminal 10% portion of the copolymer chain (as determined by monomer conversion).

Copolymers of particular interest are those in which the percentage differential styrene content changes in a zone of not more than 2½% of the copolymer chain (as determined by monomer conversion) from a first value to a second value, said second value being at least 14 percentage points greater than said first value; and said zone lies within a terminal 10% portion of the copolymer chain (as determined by monomer conversion). The 5% or 2½% portion or zone referred to above can, for example, be a terminal portion of the copolymer chain.

As can be seen from the accompanying drawings, the styrene tail in some of the copolymers of the invention is most pronounced in a very small portion of the copolymer chain, for example ½%, 1½% or 2% of the chain (as determined by total monomer conversion).

The term "vinyl content" as used herein refers to that portion by weight of the 1,3 butadiene or other diene component of the copolymer which has polymerised at the 1,2 positions. Where the diene is 1,3 butadiene the 1,2-polymerisation results in the formation of pendant vinyl groups; where the diene is other than 1,3 butadiene corresponding pendant groups are produced by 1,2-polymerisation.

The vinyl aromatic compound is normally a styrene or other mono-vinyl aromatic compound, for example: styrene, 1-vinyl naphthalene, 3,5-diethylstyrene, 4-n-propylstyrene, 2,4,6-trimethyl styrene, 4-phenyl styrene, 4-p-tolystyrene 3,5-diphenylstyrene, 3-ethyl-l-vinylnaphthalene, 8-phenyl-l-vinyl naphthalene.

Where, for example, branching or cross-linking is desired a polyfunctional vinyl compound can be used. For example, suitable polyfunctional vinyl compounds are divinyl compounds, for instance divinyl benzene.

The conjugated diene is one capable of polymerisation with styrene at the 1,2 positions and such that, when polymerised with styrene or other selected aromatic vinyl compound or compounds, it provides a polymer having desired elastomeric properties. The diene can, for example, be a butadiene or pentadiene, for example: 1,3-butadiene 2-methyl-1,3 butadiene (isoprene), 1,3-pentadienes (piperylenes), 2,3-dimethyl-1,3-butadiene, 2-methyl-1,3-pentadiene, 2,3-dimethyl-1,3-pentadiene, 2-phenyl butadiene.

The styrene-butadiene copolymers of the invention can, for example, be ones whose average styrene content is at least 10% (for example 15, 20, 25, 30 or 40%) by weight of the copolymer. However, the invention also includes copolymers whose average styrene content is less than 10% by weight, for example copolymers whose portion or portions other than the styrene-rich portion or portions has little or no styrene. Such a copolymer is that of Experiment 20 below. Mixtures of aromatic vinyl compounds and/or mixtures of dienes can be used.

The copolymers can have at one or more of their extremities a block of polystyrene or polybutadiene, particularly the latter. A polybutadiene block will normally reduce rolling resistance at some expense to wet grip, and a polystyrene block will, to a lesser extent, enhance wet grip at expense to rolling resistance. Therefore a block can be used to provide (or at least to assist in providing) a desired combination of wet grip and rolling resistance. We have found, however, that in general and polystyrene block should not have a molecular weight as much as 50,000 when the molecular weight of the copolymer (excluding the block or blocks) is 300,000.

The preferred size of any polybutadiene block is in the range from 20,000 to 50,000 or, expressed as a percentage of a 300,000 molecular weight copolymer, 7% to 17% by weight. If a polystyrene block is used for its contribution to wet grip the size of the block is preferably in the range 20,000–40,000, or expressed as a percentage of a 300,000 copolymer, 7% to 13%.

The copolymers of the invention can be obtained by a solution polymerisation process using a suitable initiator, for example, a lithium-hydrocarbon compound. Suitable monolithium initiators (providing linear polymers) are, for example: methyl lithium, ethyl lithium, n-propyl lithium, isopropyl-lithium, n-butyl lithium, sec-butyl lithium, tert. butyl lithium, n-amyl lithium, isoamyl lithium, n-hexyl lithium, n-octyl lithium, phenyl lithium.

If it is wished to produce a double or branched polymer a dilithium or other polylithium initiator can be used, for example: tetramethylene dilithium, pentamethylene dilithium, hexamethylene dilithium, phenylethylene dilithium, tetra phenylethylene dilithium. Polylithium initiators containing more than two lithium atoms per initiator molecule, are for example, those derived from lithium divinylbenzene of isoprene; such compounds are those commercially available under the trade names DILI-3 and DILI-1 (Lithium Corporation of America).

Suitable solvents (which can be two- or other multi-component solvents) for the reaction are, for example, alkanes, alkenes, cycloalkanes and cycloalkenes, for instance: benzene, toluene, xylenes, ethylbenzene, isobutane, n-pentane, iso-pentane, n-heptane, iso-octane, n-decane, cyclopentane, methyl cyclopentane, dimethylcyclopentane, cyclohexane, methyl cyclohexane, dimethylcyclohexane, 1-butene, 2-butene, 1-pentene, 2-pentene, cyclopentene.

Where it is wished to provide enhanced wet grip for tires, there is preferable used in the polymerisation reaction a substance (structure modifier) whose use results in an increased amount of the butadiene being polymerised at the 1,2-positions. Such polymerisation results in the formation of vinyl groups (or corresponding groups where other conjugated dienes are used) which enhance wet grip of tires whose tread contains the polymer. Examples of suitable modifiers are as follows:

(1) Ethers, thioethers, cyclic ethers, tertiary amines; for instance diethylether, dimethylether, tetra hydrofuran, dioxane, orthodimethoxy benzene, Monoglyme, Diglyme, triethylamine;

(2) Hexamethylphosphortriamide;

(3) Difunctional Lewis bases, for instance, tetramethyl, ethylenediamine;

(4) Organic potassium or sodium compounds, for instance potassium-tert. butoxide.

The use of structure modifiers such as those referred to in the preceding paragraph results in 1,2-polymerisation at the expense of 1,4 or other alpha-omega polymerisation. Furthermore, the copolymerisation reaction rate of styrene with butadiene increases resulting in a more random copolymerisation. Thus, by suitable choice of reaction conditions it is possible to produce a copolymer having a content of butadiene, albeit small, extending as far as that portion of the polymer produced at or towards full conversion. By use of a suitable modifier no polystyrene blocks normally form at the end of the molecule unless additional styrene is added.

Various means can be adopted to provide an enhanced and/or an increasing proportion of styrene in that portion of the copolymer formed towards the beginning and/or end of the reaction. One such means is by use of a structure modifier as previously discussed. A second means is by the addition of one or more further portions of styrene (usually with butadiene) during the reaction, either in a continuous, semi-continuous or stepwise manner. A suitable semi-continuous process is one in which, during the reaction, the concentration of reactants changes and/or one or more of the other reaction conditions changes at sequential time intervals. It will be seen that some of the processes of the Examples are semi-continuous in that they employ a mixture of styrene and butadiene in the reactor before adding the modifier, and a further one or more portions of styrene is added subsequently. Such subsequent addition can be at the same time as introduction of the modifier (or a first portion thereof) into the reaction zone and/or at a later time.

Where said second means is used the proportion of styrene which is added in subsequent additions can usefully be greater than that in the reactor initially and one or more of the subsequent additions can be of styrene without butadiene.

Suitable temperatures for the reaction are, for example, in the range from 20° to 70° or 80° C. Care has to be taken in using the higher temperatures to speed up the conversion rate because higher temperatures favour 1,4-polymerisation and thereby can lead to a reduction in vinyl content below 30%.

If desired, the copolymers of the invention can be in the form of composite molecules obtained by coupling together two or more smaller copolymer molecules. Accordingly, in a third aspect the invention provides an elastomeric copolymer obtained by coupling together two or more copolymers of the first or second aspects of the invention. The coupling can be effected conveniently by use of a coupling agent; a difunctional coupling agent, for example, dibromoethane, provides a linear coupled copolymer, and a tri- or other polyfunctional coupling agent, for example the tetra-functional compounds silicon tetrachloride (SiCl4), diethyladipate (DEAP), dimethyladipate or stannic chloride (SnCL4) provides a non-linear or branched coupled copolymer.

It is to be noted that the styrene content depicted in all the accompanying drawings is that of uncoupled copolymer.

The coupling is normally preferably performed so that the coupling copolymer molecules couple with one another at the, or an, end of the molecule not having a tail. Coupling normally is effected at the end of the copolymerisation reaction and therefore when the copolymer is one having an end tail the coupling results in the tail ceasing to be "free" but becoming linked to another copolymer molecule. Where the coupling is only partly complete, for example at 50% of the theoretical amount, the product of the coupling reaction consists partly of coupled copolymer and partly of uncoupled copolymer and the product of such coupling when used in tire treads provides, at least to come extent, a useful combination of wet grip and rolling resistance values, though increasing degrees of coupling at end tails is detrimental to said combination of values.

On the other hand, coupling of copolymers having begin tails does not reduce the amount of free tails and in consequence there is no such detriment to said combination of values. Therefore in general it is preferred, when a coupled product is required, to use a begin tail copolymer as precursor.

Another way of providing branched polymers is to use an initiator having three or more active functions.

The polymerisation process can be terminated by use of an end-stopping agent; this can be a proton-releasing compound, for instance water, an alcohol or an amine.

This invention is illustrated by the following Examples (also referred to below as "Experiments"). These Examples describe the production of copolymers of styrene and 1,3 butadiene, some of which were subsequently coupled to produce coupled copolymers. The formulation of the copolymers in elastomer compositions and the use of those compositions in (model) tires to demonstrate wet grip and rolling resistance properties of the elastomers is also described.

It will be seen that all the processes described are solution polymerisation processes using a lithium hydrocarbon compound and a structure modifier/randomiser. In some Examples the conditions are such that an increasing proportion of styrene is present in the reactor in the later part of the reaction; and in some Examples there is an excess of styrene in the reactor in the earlier part of the reaction, which falls towards the end of the reaction.

It is believed that the high proportion of styrene (in admixture with butadiene) at the early or late stage or stages of the reaction is related to the superior properties shown by the product copolymers. It will be seen that in the Examples a very full conversion was obtained, and this is believed to be of particular importance especially where a high proportion of styrene is present towards the end of the reaction.

Experiments 1 to 4 and 6 to 10 below describe the production of nine copolymers of styrene and 1,3-butadiene, two of which were subsequently coupled to produce coupled copolymers.

EXPERIMENT NO. 1

A 10 l. stainless steel reactor was charged with 2000 grams of cyclohexane and 2000 grams of isopentaine. Hereafter were added 69 grams of styrene and 231 grams of butadiene and 2.25 grams of orthodimethoxybenzene. The contents were brought to a temperature of 60° C. Next the impurities in the solvent/monomer blend, capable of reacting with sec. butyllithium were deactivated by titration with a sec. butyllithium solution in cyclohexane (conc. 100 mmol/1). After a temperature rise of 0.5° C. was observed, indicating that all impurities capable of interfering with the polymerisation reaction had been deactivated, a sec. butyl lithium solution (33.3 ml of a 100 mmol/1 solution in cyclohexane) was added to initiate the polymerisation.

Simultaneously with the addition of the initiator 700 grams of a styrene/butadiene blend (weight ratio styrene/butadiene 23/77 was pumped into the reactor at a rate of 12 grams/min.

The temperature of the reactor contents was kept at 60° C. by cooling.

After the addition of these monomer quantities the polymerisation reaction was allowed to proceed for a further 60 minutes, by which a monomer conversion of >99.9% was obtained. Hereafter 0.5 grams of methanol was added to kill the polymerisation reaction.

Finally 0.5 grams of 2.6 di-tert. butylparacresol were added as a stabiliser. The polymer was recovered from the solution by coagulation with steam.

EXPERIMENT NOS. 2 AND 3

Were carried out as experiment No. 1, except that in experiment No. 2 the amount of orthodimethoxybenzene (ODMB) added was 1.13 grams and experiment No. 3 the amount of ODMB was 0.50 grams.

EXPERIMENT NO. 4

A 10 l. stainless steel reactor was charged with 2000 grams of cyclohexane and 2000 grams of isopentane. Hereafter were added 15 grams of styrene, 85 grams of butadiene and 2.25 grams of orthodimethoxybenzene. The contents were brought to a temperature of 60° C. Next the impurities in the solvent/monomer blend, capable of reacting with sec. butyllithium were deactivated by titration with a sec. butyllithium solution in cyclohexane (conc. 100 mmol/1). After a temperature rise of 0.5° C. was observed, indicating that all impurities capable of interferring with the polymerisation reaction had been deactivated, a sec. butyl-lithium solution (33.3 ml of a 100 mmol/1solution in cyclohexane) was added to initiate the polymerisation.

Simultaneously with the addition of the initiator 400 grams of a styrene/butadiene blend (weight ration styrene/butadiene 15/85) was pumped into the reactor at a rate of 20 grams/min.

The temperature of the reactor contents were kept at 60° C. by cooling.

Immediately after the addition of monomers had been completed another portion of 500 grams of styrene/butadiene blend (weight ratio styrene/butadiene 31/69) was pumped into the polymer solution likewise at a rate of 20 grams/min.

After the addition of these monomer quantities the polymerisation reaction was allowed to proceed for a further 90 minutes, by which a monomer conversion of >99.9% was obtained. Hereafter 0.5 grams of methanol was added to kill the polymerisation reaction.

Finally 0.5 grams of 2.6 di-tert. butylparacresol were added as a stabiliser. The polymer was recovered from the solution by coagulation with steam.

EXPERIMENT NO. 6

A 10 l. stainless steel reactor was charged with 2000 grams of cyclohexane and 2000 grams of isopentane. Hereafter were added 115 grams of styrene, 38.5 grams of butadiene and 2.25 grams of orthodimethoxybenzene. The contents were brought to a temperature of 60° C. Next the impurities in the solvent/monomer blend, capable of reacting with sec. butyllithium were deactivated by titration with a sec. butyllithium solution in cyclohexane (conc. 100 mmol/1). After a temperature rise of 0.5° C. was observed, indicating that all impurities capable of interfering with the polymerisation reaction had been deactivated, a sec. butyl lithium solution (33.3 ml of a 100 mmol/1 solution in cyclohexane) was added to initiate the polymerisation.

Simultaneously with the addition of the initiator 654 grams of a styrene/butadiene blend (weight ration styrene/butadiene 17.5/82.5) was pumped into the reactor at a rate of 43.6 grams/min. The temperature of the reactor contents was kept at 60° C. by cooling.

Immediately after the addition of monomers had been completed 192.5 grams of butadiene was pumped into the polymer solution at a rate of 2.00 grams/min.

After the addition of the last monomer quantity the polymerisation reaction was allowed to proceed for a further 40 minutes, by which a monomer conversion of >99.9% was obtained. Hereafter 0.5 grams of methanol was added to kill the polymerisation reaction.

Finally 0.5 grams of 2.6 di-tert. butylparacresol were added as a stabiliser. The polymer was recovered from the solution by coagulation with steam.

EXPERIMENT NO. 7

A 10 l. stainless steel reactor was charged with 2000 grams of cyclohexane and 2000 grams of isopentane. Hereafter were added 30 grams of styrene, 70 grams of butadiene and 2.25 grams of orthodimethoxybenzene. The contents were brought to a temperature of 60° C. Next the impurities in the solvent/monomer blend, capable of reacting with sec. butyllithium were deactivated by titration with a sec. butyllithium solution in cyclohexane (conc. 100 mmol/1). After a temperature rise of 0.5° C. was observed, indicating that all impurities capable of interfering with the polymerisation reaction had been deactivated, a sec. butyllithium solution (33.3 ml of a 100 mmol/1solution in cyclohexane) was added to initiate the polymerisation.

Simultaneously with the addition of the initiator 900 grams of a styrene/butadiene blend (weight ratio styrene/butadiene 22.2/77.8) were pumped into the reactor at a rate of 15 grams/min. The temperature of the reactor contents was kept at 60° C. by cooling.

The polymerisation reaction was allowed to proceed for a further 90 minutes, by which a monomer conversion of >99.9% was obtained. Hereafter 0.5 grams of methanol were added to kill the polymerisation reaction.

Finally 0.5 grams of 2.6 di-tert. butylparacresol were added as a stabiliser. The polymer was recovered from the solution by coagulation with steam.

EXPERIMENT NO. 8

A 10 l. stainless steel reactor was charged with 2000 grams of cyclohexane and 2000 grams of isopentane. Hereafter were added 115 grams of styrene, 38.5 grams of butadiene and 2.25 grams of orthodimethoxybenzene. The contents were brought to a temperature of 60° C. Next the impurities in the solvent/monomer blend, capable of reacting with sec. butyllithium were deactivated by titration with a sec. butyllithium solution in cyclohexane (conc. 100 mmol/1). After a temperature rise of 0.5° C. was observed, indicating that all impurities capable of interfering with the polymerisation reaction had been deactivated, a sec. butyllithium solution (66.6 ml of a 100 mmol/1solution in cyclohexane) was added to initiate the polymerisation.

Simultaneously with the addition of the initiator 654 grams of a styrene/butadiene blend (weight ratio styrene/butadiene 17.5/82.5) was pumped into the reactor at a rate of 81.7 grams/min. The temperature of the reactor contents were kept at 60° C. by cooling.

Immediately afterthe addition of monomershad been completed 192.5 grams of butadiene was pumped into the polymer solution at a rate of 1.9 grams/min.

After the addition of these monomer quantities the polymerisation reaction was allowed to proceed for a further 40 minutes, by which a monomer conversion of >99.9% was obtained. Hereafter 0.33 grams of diethyladipate was added to couple the polymer chains to a polymer with a branched structure of a fourfold increased molecular weight (coupling efficiency ~50%). Next 0.5 grams of methanol was added to kill the polymerisation reaction.

Finally 0.5 grams of 2.6 di-tert. butylparacresol were added as a stabiliser. The polymer was recovered from the solution by coagulation with steam.

EXPERIMENT NO. 9

A 10 l. stainless steel reactor was charged with 2000 grams of cyclohexane and 2000 grams of isopentane. Hereafter were added 115 grams of styrene, 38.5 grams of butadiene and 2.25 grams of orthodimethoxybenzene. The contents were brought to a temperature of 60° C. Next the impurities in the solvent/monomer blend, capable of reacting with sec. butyllithium were deactivated by titration with a sec. butyllithium solution in cyclohexane (conc. 100 mmol/1). After a temperature rise of 0.5° C. was observed, indicating that all impurities capable of interfering with the polymerisation reaction had been deactivated, a sec. butyllithium solution 66.6 ml of a 100 mmol/1 solution in cyclohexane) was added to initiate the polymerisation.

Simultaneously with the addition of the initiator 654 grams of a styrene/butadiene blend (weight ratio styrene/butadiene 17.5/82.5) was pumped into the reactor at a rate of 81.7 grams/min. The temperature of the reactor contents were kept at 60° C. by cooling.

Immediately after the addition of monomers had been completed 192.5 grams of butadiene was pumped into the polymer solution at a rate of 1.9 grams/min.

After the addition of these monomer quantities the polymerisation reaction was allowed to proceed for a further 40 minutes, by which a monomer conversion of >99.9% was obtained. Hereafter 0.66 grams of dibromoethan was added to couple the polymer chains to a linear polymer of a twofold increased molecular weight (coupling efficiency ~50%). Next 0.5 grams of methanol was added to kill the polymerisation reaction.

Finally 0.5 grams of 2.6 di-tert. butylparacresol were added as a stabiliser. The polymer was recovered from the solution by coagulation with steam.

EXPERIMENT NO. 10

A 10 l. stainless steel reactor was charged with 2000 grams of cyclohexane and 2000 grams of isopentane. Hereafter were added 55 grams of styrene, 44.5 grams of butadiene and 2.25 grams of orthodimethoxybenzene. The contents were brought to a temperature of 60° C. Next the impurities in the solvent/monomer blend, capable of reacting with sec. butyllithium were deactivated by titration with a sec. butyllithium solution in cyclohexane (conc. 100 mmol/l). After a temperature rise of 0.5° C. was observed, indicating that all impurities capable of interfering with the polymerisation reaction had been deactivated, a sec. butyllithium solution 33.3 ml of a 100 mmol/l solution in (cyclohexane) was added to initiate the polymerisation.

After the addition of these monomer quantities the polymerisation reaction was allowed to proceed for a further 60 minutes, by which a monomer conversion of >99.9% was obtained. Hereafter 0.5 grams of methanol was added to kill the polymerisation Finally 0.5 grams of 2.6 di-tert. butylparacresol were added as a stabiliser. The polymer was recovered from the solution by coagulation with steam.

The Examples are accompanied by graph prints showing a plot of percentage differential styrene in the copolymer part of the molecule against total monomer conversion (which corresponds to percentage molecular size of the copolymer molecules). The differential styrene contents at various conversions were calculated from the copolymerisation kinetics of styrene and butadiene using the following equation (1)

$$\frac{S1}{B1} = \frac{S}{B} \cdot \frac{R1\, S + B}{R2\, B + S} \qquad (1)$$

in which
S1 = weight fraction of styrene in copolymer
B1 = weight fraction of butadiene in copolymer
S = weight fraction of styrene in monomer blend
B = weight fraction of butadiene in monomer blend
R1 = reactivity ratio of styrene
R2 = reactivity ratio of butadiene.

The styrene and butadiene weight fractions in the copolymer in relation to their weight fractions in the monomer blend were determined by polymerising styrene and butadiene feeds of varying compositions to conversions below 5% and measuring the styrene and butadiene content of the resulting copolymers by infra red analysis.

Knowing this relation, R1 and R2 were calculated according to the method described by Fineman and Ross in J. Polymer Science, 5, (1950) page 259.

For example, under the polymerisation conditions applied in the majority of the Examples, viz. at 60° C. in cyclohexane as a solvent and using a modifier (ODMB) concentration of 450 PPM, we measured for R1 and R2 values of 0.73 and 1.40 for styrene and butadiene respectively. Thus, starting with a monomer feed of known composition one can calculate the copolymer composition at the onset of copolymerisation (approaching zero 0/0 conversion) with the aid of equation (1). The composition of polymer fractions formed at further points in polymerisation time or conversions can then be calculated, using the equation, from the monomer composition remaining after a preceding polymer fraction or increment has been formed.

The graph prints are included in the accompanying drawings and are referred to as Prints 1 to 4 and 6 to 10, corresponding to Experiments 1 to 4 and 6 to 10, respectively.

In the prints total monomer conversion is referred to, for the sake of convenience, as "monomer conversion" the horizontal lines represent the average styrene content (%) of the polymer.

Referring to print 1 of the accompanying drawings, it will be seen that the molecule of the polymer of Example 1 can be regarded as being composed of three portions: a first end portion comprising about 40% of the molecule, in which the styrene content is not greater throughout than the average styrene content of the copolymer (23%), rising from about 17% to 23%; a second portion comprising about 49% of the molecule in which the styrene content is substantially the same throughout as the average styrene content; and a second end portion comprising about 10% of the molecule, in which the styrene content is greater throughout than the average styrene content of the polymer. This last-mentioned portion has a styrene-rich component or "tail" in which the styrene content rises at an increasing rate from about the 90% monomer conversion mark towards 100%, and the styrene content at the outer end of the end portion (or later end in terms of the production of the polymer) reaches a maximum of 57%.

The various values for the sizes of portions of the molecule and the differential styrene contents thereof can be obtained by reading off the respective print. For example, referring again to Print 1, it will be seen that the differential styrene content rises in the last 5% portion of monomer conversion (i.e. from 95% to 100% conversion) from a first (threshold) value (T) to 27% to a maximum value (M) of 57% at 100% monomer conversion, a rise (M-T) of 30 percentage points; and that in the last 2½% portion of total monomer conversion the differential styrene content changes from a threshold value (T') of 31% to the maximum value of 57%, a rise (M-T') of 26 percentage points. The values M, T, (M-T), T' and (M-T') are given in Table B below.

Prints 2 and 3 show that the polymers of Examples 2 and 3 have a structure broadly similar to that of Example 1, having a first end portion, a middle portion and a second end portion, the last-mentioned portion have a styrene-rich component in which the styrene content rises steeply from the average styrene content.

From Print 2 it can be seen that the threshold value (T) of differential styrene content at 95% monomer conversion is 32%, the threshold value (T') at 97½% monomer conversion is 39 and the maximum styrene content is 72%. Thus, the differential styrene content rises by 40 percentage points over the last 5% portion of monomer conversion and by 33 percentage points over the last 2½% of monomer conversion.

In print 6 it is the first end portion (referred to herein as a "begin tail") of the molecule that has the styrene-rich component, and the second or later end portion has a styrene content less that the average styrene content of the polymer; in between the styrene content is substantially the same as the average styrene content of the polymer.

It will be seen that the differential styrene content of the copolymer of Experiment 6 changes over that portion of monomer conversion between 0% and 5% conversion from a first (threshold) value (T) of 46 to a second (maximum) value (M) of 71% at 0% monomer conversion, that is, a change (M-T) of 25 percentage points; and that over the terminal 2½% zone of said 5% portion the differential styrene content changes from a first (threshold) value (T') of 56% to the second (maximum) value (M) of 71% at 0%, that is, a change (M-T') of 15 percentage points.

The respective values of M, T, T', (M-T) and (M-T') for all of the copolymers of Experiments 1-10 are given in Table B from which it will be seen that all the values for (M-T) are 25 percentage points or more and that all the values for (M-T') are 14 percentage points or more. In that Table under the heading "Tail" it is stated whether the copolymer tail occurs at or towards the beginning of the monomer conversion (a "begin tail") or at or towards the end of the monomer conversion (an "end tail").

Prints 8 and 9 illustrate the polymers of Experiments 8 and 9 which are formed as the result of coupling a polymer obtained substantially as in Experiment 6, and it will be seen that those two prints are similar to that of print 6. The polymer of print 8 is believed to be branched and comprises four polymer linear chains coupled together whereas that of print 9 is believed to be linear and to comprise two polymer linear chains coupled together.

As is made clear from the prints, reference above to certain percentage proportions of the "length of the molecule" are derived from the corresponding figures for monomer conversion, and it is not to be inferred that the molecules of any given polymer are all of the same length.

It will be seen from the prints that in the various end portions the differential styrene content rises rapidly towards a high value corresponding to approximately 100% (or 0%) of the length of the polymer molecule as measured in terms of monomer conversion; and in some of the polymers the increase is particularly great over the last few (for example, one, two or three) percent of the polymer length.

It will be seen from Table A that the vinyl content (that is the amount of the butadiene component of the polymer that has polymerised at the 1,2-positions) is in each case 30% or more and that most of the values lie in the range 40 to 50%, especially 45 to 50%. The styrene content of each polymer is in the range 20 to 30%.

TABLE A

| Experiment | Styrene Content % (Average) | Vinyl Content % | Chain Structure |
|---|---|---|---|
| 1 | 23 | 48 | L |
| 2 | 23 | 42 | L |
| 3 | 23 | 30 | L |
| 4 | 23 | 49 | L |
| 6 | 23 | 47 | L |
| 7 | 23 | 47 | L |
| 8 | 23 | 47 | B (DEAP-coupled) |
| 9 | 23 | 47 | L (DBE-coupled) |
| 10 | 23 | 47 | L |

Notes:
DEAP = diethyl adipate
DBE = dibromoethane
L = linear
B = branched

TABLE B

| Experiment No. | Tail* | Threshold (T) at 5% | Threshold (T) at 95% | Maximum (M) | M-T | Threshold (T') | M-T' |
|---|---|---|---|---|---|---|---|
| 1 | E | — | 27 | 57 | 30 | 31 | 26 |
| 2 | E | — | 32 | 72 | 40 | 39 | 33 |
| 3 | E | — | 36 | 72 | 36 | 46 | 26 |
| 4 | E | — | 37 | 97 | 60 | 41 | 56 |
| 6 | B | 46 | — | 71 | 25 | 56 | 15 |
| 7 | E | — | 27 | 56 | 29 | 31 | 25 |
| 8 | B | 46 | — | 71 | 25 | 57 | 14 |
| 9 | B | 46 | — | 71 | 25 | 57 | 14 |
| 10 | E | — | 43 | 79 | 36 | 48 | 31 |
| 11,12 | E | — | 37 | 95 | 58 | 42 | 53 |
| 13 | E | — | 38 | 95 | 57 | 42 | 53 |
| 14,14A 15,16 | E | — | 37 | 95 | 58 | 43 | 52 |
| 16B | B | 31 | — | 82 | 51 | 38 | 44 |
| 16C | B | 44+ | — | 94 | 50 | 71 | 23 |
| 16D | B | 29 | — | 83 | 54 | 35 | 48 |
| 17 | E | — | 34 | 97 | 63 | 38 | 59 |
| 18 | E | — | 39 | 97 | 58 | 34 | 63 |
| 19 | E | — | 24 | 97 | 73 | 27 | 70 |
| 20 | E | — | 13 | 94 | 81 | 19 | 75 |
| 21 | E | — | 37 | 95 | 58 | 42 | 53 |
| 22 | E | — | 41 | 97 | 56 | 46 | 51 |
| 23 | E | — | 47 | 97 | 50 | 51 | 46 |
| 24 | E | — | 51 | 98 | 47 | 56 | 42 |
| 26 | B | 19++ | — | 92 | 73 | 27 | 65 |
| 27 | B | 21 | — | 48 | 27 | 21 | 27 |
| 28 | B | 21+++ | — | 47 | 26 | 21 | 26 |
| 35/36 | B | 30 | — | 83 | 53 | 38 | 45 |
| 37 | B | 37 | — | 83 | 46 | 50 | 33 |

+based on 5% band at 3-8% conversion
++based on 5% band at 2½-7½% conversion
+++based on 5% band at ½-5½% conversion The compositions of Examples 1 to 10 have been tested to assess their wet grip and rolling resistance properties on a road surface. Each of those compositions was used as the tread compound of model tires of size 2.25-8 (dimensions in inches). These model tires were subjected to two tests as follows.

Grip on a wet Delugrip road surface (Delugrip is a Registered Trade Mark) was measured using the variable speed internal drum machine (VSIDM) described in a paper by G. Lees and A. R. Williams in Journal of the Institute of the Rubber Industry, Vol. 8, No. 3, June 1974. Measurements of the wet grip were made for locked wheel sliding friction. Rolling resistance was measured using the rotary power loss machine described in Transactions of the Institution of Rubber Industry 34, No. 5, October 1958, applying Equation 3.1 given below.

The results obtained are shown in Table C below. Equation 3.1, as applied to SP4 steel radial tires of Dunlop Limited, referred to in the table is as follows:

$$\text{rolling resistance} = 8.75E'' + 0.83\frac{E''}{(E^*)^2} + 66$$

where $E''$ and $E''/(E^*)^2$ have the following meanings:
$E''$ = loss modulus expressed in MPa
$E^*$ = complex modulus expressed in MPa
The expression $E''/(E^*)^2$ is expressed in $GN/m^2$.

TABLE C

| Example No. | Wet Grip Sliding Friction | Rolling Resistance calculated according to Equation 3.1 |
|---|---|---|
| Comparisons: | | |
| S-1502 | 100 | 100 |
| S-1712 | 116 | 101 |
| OEP/LTP | 112 | 115 |
| 1. | 108 | 93 |
| 2. | 105 | 91 |
| 3. | 104 | 90 |
| 4. | 116 | 93 |
| 6. | 105 | 94 |
| 7. | 109 | 92 |
| 8. | 110 | 99 |
| 9. | 108 | 95 |
| 10. | 108 | 95 |

It will be seen from Table C that the tires tested have a good combination of wet grip and rolling resistance. It is believed that the end portion of the polymer molecule having the styrene-rich component makes a major contribution to the good wet grip and that the remainder of the molecule having a substantial vinyl content and free from a styrene-rich component makes a major contribution to the good rolling resistance.

The production of further copolymers of the invention, their formulation in elastomeric compositions and use of those compositions in the tread portion of tires is described below.

Abbreviations used have the following meanings:
S = styrene
B = butadiene
S/B = mixture of styrene and butadiene
SBR = styrene-butadiene copolymer
ODMB = ortho-dimethoxybenzene
DEAP = diethyl adipate
DVB = divinyl benzene
S-BuLi = secondary butyl lithium
Diglyme = diethylene glycol dimethylether
PS = polystyrene
MW = molecular weight
B = branched molecule
L = linear molecule
min = minutes
BC = before coupling.

Unless otherwise stated the ratios and percentages referred to in the Experiments are by weight.

Experiments 11, 12 and 13 relate to copolymers having small polystyrene blocks at one or two ends of the molecule.

Experiments 14 to 15C relate to copolymers having a branched structure.

Experiments 17 to 24 relate to copolymers having different proportions of bound styrene in the main chain of the molecule.

Experiments 26, 27 and 28 relate to copolymers subsequently converted to branched form by coupling using DEAP.

There now follows descriptions of the production of the copolymers.

EXPERIMENT 11

A styrene-butadiene copolymer was produced using the ingredients and conditions referred to in Table 1A below. The procedure used was as follows.

A 10 liters stainless steel reactor was charged with 4000 grams of cyclohexane. Thereafter were added a first (1) batchwise charge of monomer and the ODMB, and the contents were brought to a temperature of 60° C. Next, the impurities in the solvent/monomer blend, capable of reacting with sec. butyllithium were deactivated by titration with a sec. butyllithium solution in cyclohexane (conc. 100 mmol/l). After a temperature rise of 0.5° C. was observed, indicating that all impurities capable of interfering with the polymerisation reaction had been deactivated, the sec. butyllithium solution (33.3 ml of a 100 mmol/l solution in cyclohexane) was added to initiate the polymerisation.

After 10 minutes the second (2) batchwise charge of monomers was added, immediately followed by the first continuous addition of monomer over a period of 25 minutes. The temperature of the reactor contents was kept at 60° C. by cooling.

Immediately after the first continuous addition of monomers had been completed the second continuous addition of monomers was pumped into the reactor during 25 minutes. Thereafter, the polymerisation reaction was allowed to proceed for a further 60 minutes by which time a monomer conversion of more than 99.9% had been obtained. Then 0.5 gram of methanol was added to kill the polymerisation reaction. 0.5 gram of 2,6 di-tert. butylparacresol was added as a stabiliser. The polymer was recovered from the solution by coagulation with steam.

EXPERIMENT 12

The procedure of Experiment 11 was followed except that there was only one batchwise charge of monomers, which immediately after initiation of the polymerisation was followed by three successive, continuous additions of monomer(s) over a period of 55 min.

EXPERIMENT 13

The procedure of Experiment 11 was followed, except that there was a third continuous addition, immediately after the second continuous addition had been completed.

EXPERIMENTS 14, 14A, 15, 16, 16B, 16C AND 16D

Seven branched styrene-butadiene copolymers were produced using the ingredients and conditions referred to in Table IIA. The procedure used was that described in Experiment 12 except that there were only two continuous additions and, in Experiments 14, 14A, 15, 16B, 16C and 16D, there was added to the reactor after 90 or 120 minutes a coupling agent as indicated in Table IIA. Use of the coupling agent (0.08 mmol) DEAP or $SnCL_4$) resulted in the copolymer chains being partly (about 50%) coupled to give a polymer with a branched structure having a fourfold molecular weight.

In experiment 16 coupling or branching was obtained by use of DVB in a third addition stage.

After the coupling methanol and 2.6 di-tert. butylparacresol were added as described in Experiment 11.

EXPERIMENTS 17 TO 24

Further styrene-butadiene copolymers were produced using the ingredients and conditions referred to in Tables IIIA and IVA. The procedure was that described in Experiment 11 except that there was only one batchwise monomer charge and only one continuous monomer charge.

EXPERIMENTS 26, 27 AND 28

Three further styrene-butadiene copolymers were produced using the ingredients and conditions referred to in Table VA. The procedures used were as follows:

EXPERIMENT 26

Begin tail: Amount: 5% of total polymer: styrene/butadiene ratio 90/10
Main chain: Amount: 95% of total polymer: styrene/butadiene ratio 19.5/80.5

A stainless steel reactor of 10 liters capacity was charged with 4000 grams of cyclohexane, 45 grams of styrene, 5 grams of butadiene and 2.25 grams of ODMB. The contents were brought to a temperature of 60° C. by external heating of the reactor. Next the polymerisation of the monomers was initiated by addition of 66.6 ml of a solution of S-BuLi in cyclohexane of a concentration of 100 mmol/liter. After a polymerisation time of 30 minutes during which virtually all of the monomers were converted into a styrene-butadiene copolymer, a blend of 185 grams of styrene and 765 grams of butadiene was added in 20 minutes. During this addition the temperature of the reactor contents was kept at 60° C. After the monomers had been added the polymerisation reaction was prolonged for another 60 minutes at 60° C. after which 0.30 grams of DEAP were added in order to couple the living linear polymer chains into a polymer of radial structure. Next 0.5 grams of 2.6 di-tertiary butylparacresol were added as a stabiliser, after which the copolymer was recovered from the solution by steam coagulation and drying. Characteristics of the polymer are shown in Table VB.

EXPERIMENT 28

Begin tail: Amount: 2% of total polymer; styrene/butadiene ratio 40/60
Main chain: Amount: 98% of total polymer; styrene/butadiene ratio 22.7/77.3

The reactor of Experiment 26 was charged with 4000 grams of cyclohexane, 8 grams of styrene, 12 grams of butadiene and 2.25 grams of ODMB. The monomers were polymerized at 60° C. by addition of 66.6 ml of a S.BuLi solution in cyclohexane of 100 mmol/liter. After 30 minutes a blend of 222 grams of styrene and 758 grams of butadiene were fed into the reaction zone in 20 minutes. Thereafter the same procedure was followed as in Experiment 26. Characteristics of the polymer are likewise shown in Table VB.

EXPERIMENT 27

Begin tail: Amount: 5% of total polymer; styrene/butadiene ratio 40/60
Main chain: Amount: 95% of total polymer; styrene/butadiene ratio 40/60 and ratio 22.1/77.9.

The reactor of Experiment 26 was charged with 4000 grams of cyclohexane, 20 grams of styrene, 30 grams of butadiene and 2.25 grams of ODMB. Polymerisation was initiated by addition of 66.6 ml of a S-BuLi solution in cyclohexane of 100 mmol/liter. After 30 minutes a blend of 210 grams of styrene and 740 grams of butadiene were fed into the reaction zone in 20 minutes. Thereafter the same procedure was followed as in Experiment 26. Characteristics of the polymer are shown in Table VB.

TABLE 1A

| Exp. No. | Sample No. | Batchwise Charged Monomer | Modifier ppm on total intake | BuLi m·mol | Continuously Charged 1st Addition | 2nd Addition | 3rd Addition | Polymerisation conditions |
|---|---|---|---|---|---|---|---|---|
| 11 | WB 223/224 | (1)16.7 g S after 10 min. (2) 48.3 g S/B ratio 11.7/88.3 | 450 ODMB | 3.33 | 435 g S/B ratio 11.7/88.3 in 25 min. | 500 g S/B ratio 31/69 in 25 min. | — | 120 min. 60° C. |
| 12 | WB 225/226 | 48.3 g S/B ratio 11.7/88.3 | 450 ODMB | 3.33 | 435 g S/B ratio 11.7/88.3 in 25 min. | 500 g S/B ratio 31/69 in 25 min. | 16.79 S in 5 min. | 120 min. 60° C. |
| 13 | WB 231/232 | (1) 16.7 g S after 10 min. (2) 46.6 g S/B ratio 8.4/91.6 | 450 ODMB | 3.33 | 420 g S/B ratio 8.4/91.6 in 25 min. | 500 g S/B ratio 31/69 in 25 min. | 16.79 S in 5 min. | 120 min. 60° C. |

Polymerisation Data
Solvent: Cyclohexane, 4000 g
Amount of Polymer: 1000 g
Final Solids Content: 20% w

TABLE 11A

| Exp. No. | Batchwise Charged Monomer | modifier ppm on total intake | BuLi mmol | Continuously Charged 1st Addition | 2nd Addition | 3rd Addition | Polymerisation conditions | Coupling Agent mmol |
|---|---|---|---|---|---|---|---|---|
| 14 | 150 g S/B ratio 15/85 | 450 ODMB | 3.33 | 350 g S/B ratio 15/85 in 25 min. | 500 g S/B ratio 31/69 in 25 min. | | 90 min. 60° C. | DEAP |
| 14A | 150 g S/B | 150 | 3.5 | 350 g S/B | 500 g S/B | | 90 min. 50° C. | DEAP |

TABLE IIA-continued

| Exp. No. | Batchwise Charged Monomer | modifier ppm on total intake | BuLi mmol | Continuously Charged 1st Addition | 2nd Addition | 3rd Addition | Polymerisation conditions | Coupling Agent mmol |
|---|---|---|---|---|---|---|---|---|
| 15 | 150 g S/B ratio 15/85 | 450 ODMB Diglyme | 5.5 | 350 g S/B ratio 15/85 in 25 min. | 500 g S/B ratio 31/69 in 25 min. | | 90 min. 60° C. | SnCl$_4$ |
| 16 | 150 g S/B ratio 15/85 | 450 ODMB | 3.33 | 350 g S/B ratio 15/85 in 25 min. | 500 g S/B ratio 31/69 in 25 min. | 3.33 mmol DVB | 120 min. 60° C. | — |
| 16B | 23 g S | 450 ODMB | 8.0 | 900 g S/B ratio 23/77 in 80 min. | 77 g B in 20 min. | | 120 min. 60° C. | DEAP |
| 16C | 94.3 g S 5.0 g B | 150 Diglyme | 6.7 | After 5 min. 830 g S/B ratio 16.3/83.7 in 40 min. | 70 g B in 35 min. | | 100 min. 50° C. | DEAP |
| 16D | 23.0 g S g B 3.8 | 450 ODMB | 6.7 | After 1 min. 900 g S/B ratio 23/77 in | 73.2 g B in 30 min. | | 120 min. 60° C. | DEAP |

POLYMERISATION DATA
Solvent: cyclohexane, 4000 g
Final Solids content: 20% w
Amount of polymer: 1000 g

TABLE IIIA

| Exp. No. | Sample No. | Batchwise Charged Monomer | modifier ppm on total intake | BuLi m·mol | Continuously Charged 1st Addition | 2nd Addition | 3rd Addition | Polymerisation conditions |
|---|---|---|---|---|---|---|---|---|
| 17 | D250/251 | 900 grams S/B ratio 22.1/77.9 | 450 ODMB | 3.33 | After 15 min 100 grams S/B ratio 31/69 in 15 min. | — | — | 120 min. 60° C. |
| 18 | D252/253 | 900 grams S/B grams 16.6/83.4 | 450 ODMB | 3.33 | after 15 min 100 grams S/B ratio 31/69 in 15 min. | — | — | 120 min. 60° C. |
| 19 | D255/256 | 900 grams S/B ratio 6.6/93.4 | 450 ODMB | 3.33 | after 15 min 100 grams S/B ratio 31/69 in 15 min. | — | — | 120 min. 60° C. |
| 20 | D257/259 | 900 grams butadiene | 450 ODMB | 3.33 | after 15 min 100 grams S/B ratio 31/69 in 15 min. | — | — | 120 min. 60° C. |

POLYMERISATION DATA
Solvent: Cyclohexane, 4000 g.
Amount of Polymer: 1000 g
Final Solids content: 20% w.

TABLE IVA

| Exp. No. | Sample No. | Batchwise Charge Monomer | Modifier ppm on total intake | BuLi m·mol | Continuously Charged 1st Addition | 2nd Addition | Polymerisation conditions |
|---|---|---|---|---|---|---|---|
| 21 | WB236/237 | 100 grams S/B ratio 15/85 | 450 | 3.33 | After 1 min. 400 grams S/B ratio 15/85 in 20 min. | After 21 min. 500 grams S/B ratio 31/69 in 25 min. | 120 min. 60° C. |
| 22 | WB242/243 | 100 grams S/B ratio 10/90 | 450 | 3.33 | After 1 min. 400 grams S/B ratio 10/90 in 20 min. | After 21 min. 500 grams S/B ratio 36/64 in 25 min. | 120 min. 60° C. |
| 23 | WB244/245 | 100 grams S/B ratio 5/95 | 450 | 3.33 | After 1 min. 400 grams S/B ratio 5/95 in | After 21 min. 500 grams S/B ratio 41/59 | 120 min. 60° C. |

TABLE 1VA-continued

| Exp. No. | Sample No. | Batchwise Charge Monomer | Modifier ppm on total intake | BuLi m·mol | Continuously Charged 1st Addition | Continuously Charged 2nd Addition | Polymerisation conditions |
|---|---|---|---|---|---|---|---|
| 24 | WB246/247 | 100 grams S/B ratio 0/100 | 450 | 3.33 | 20 min. After 1 min. 400 grams S/B ratio 0/100 in 20 min. | in 25 min. After 21 min. 500 grams S/B ratio 46/54 in 25 min. | 120 min. 60° C. |

POLYMERISATION DATA
Solvent: cyclohexane 4000 g
Final Solids Content: 20% w
Amount of Polymer: 1000 g

TABLE VA

| | Batchwise Charged | | | | | | | | | |
|---|---|---|---|---|---|---|---|---|---|---|
| | 1st step | | | | 2nd step | | | | | |
| | | | ODMB (modifier) | | ODMB (modifier) | Continuously charged in the second step | | Polymerisation conditions | | |
| | Monomer | | ppm | sec. | ppm on | | Buta- | time min. | | temp. °C. |
| Exp. No. & Sample | Styrene grams | Butadiene grams | on total intake | BuLi mmol | total intake | Styrene grams | diene grams | 1st st. | 2nd st. | 1st st. | 2nd st. |
| 26(D292/293) | 49.5 | 5.5 | 450 | 7.33 | 450 | 204 | 842 | 30 | 60 | 50 | 50 |
| 27(PS241) | 8.8 | 13.2 | 450 | 7.33 | 450 | 244 | 847 | 30 | 60 | 50 | 50 |
| 28(PS242) | 22 | 33 | 450 | 7.33 | 450 | 231 | 814 | 30 | 60 | 50 | 50 |

POLYMERISATION DATA
Solvent 1st step: Cyclohexane 2.340 kg
Solvent 2nd step: Cyclohexane 2.340 kg
Final Solids Content: 19% w
Amount of Polymer: 1100 grams Salient data concerning the structure of the copolymers of the Experiments, is set out in Tables 1B, 11B, 111B, IVB and VB shown below.

In the tables:
the Mooney values are ML 1+4 100° C.;
the IR analysis values are in weight %
$Q = \overline{M}w/\overline{M}n$.

TABLE 1B

| Exp. No. | Sample No. | GPC Analysis app Mw × 10³ Peak | Mw | Mn | $\overline{M}w/\overline{M}n$ | IR Analysis Butadiene part vinyl | CIS | trans | Styrene | Mooney |
|---|---|---|---|---|---|---|---|---|---|---|
| 11 | WB223/224 | 450 | 453 | 252 | 1.80 | 46 | 19 | 35 | 24.6 | 106 |
| 12 | WB225/226 | 390 | 377 | 220 | 1.72 | 46 | 19 | 35 | 23.9 | 90 |
| 13 | WB231/232 | 400 | 383 | 248 | 1.55 | 49 | 15 | 36 | 24.3 | 98 |

TABLE 11B

| Exp. No. | Sample No. | Chain Modifier | Structure | Peak BC | GPC analysis App Mw × 10³ Mw | Mn | $\overline{M}w/\overline{M}n$ | Coupling % | IR analysis on butadiene part Vinyl | Cis | Trans | Styrene | Mooney |
|---|---|---|---|---|---|---|---|---|---|---|---|---|---|
| 14 | GM38/40/41 | ODMB | B/DEAP | 510 | 695 | 379 | 1.83 | 19 | 46 | 19 | 35 | 23.7 | 108 |
| 14A | GM43/46/47 | Diglyme | B/DEAP | 450 | 736 | 210 | 3.5 | 30 | 70 | 10 | 20 | 22.8 | 114 |
| 15 | PS210/211 | ODMB | B/SnCl4 | 325 | 612 | 256 | 2.38 | 35 | 50 | 17 | 33 | 24.1 | 94 |
| 16 | PS208/209 | ODMB | B/DVB copol | 460 | 558 | 252 | 2.21 | 10 | 50 | 17 | 33 | 24.8 | 119 |
| 16B | WRC5801 | ODMB | B/DEAP | 190 | 441 | 147 | 3.01 | 56 | 47 | 18 | 35 | 24.9 | 56 |
| 16C | PS/214/216 | Diglyme | B/DEAP | 320 | 626 | 139 | 4.5 | 42 | 66 | 11 | 23 | 22.9 | 78 |
| 16D | WRC5802 | ODMB | B/DEAP | 183 | 432 | 278 | 1.55 | 63 | 47 | 17 | 36 | 24.8 | 47 |

TABLE 111B

| Exp. No. | Sample No. | GPC Analysis App Mw × 10³ Peak | Mw | Mn | $\overline{M}w/\overline{M}n$ | IR Analysis Butadiene part Vinyl | CIS | Trans | Styrene | Mooney |
|---|---|---|---|---|---|---|---|---|---|---|
| 17 | D250/251 | 410 | 403 | 258 | 1.56 | 48 | 17 | 35 | 24.7 | 98 |
| 18 | D252/253 | 470 | 522 | 314 | 1.66 | 48 | 17 | 35 | 20.1 | 100 |
| 19 | D255/256 | 460 | 458 | 313 | 1.47 | 49 | 17 | 34 | 10.2 | 102 |

TABLE IIIB-continued

| Exp. No. | Sample No. | GPC Analysis App Mw × 10³ Peak | $\overline{Mw}$ | $\overline{Mn}$ | $\overline{Mw}/\overline{Mn}$ | IR Analysis Butadiene part Vinyl | CIS | Trans | Styrene | Mooney |
|---|---|---|---|---|---|---|---|---|---|---|
| 20 | D257/259 | 490 | 503 | 308 | 1.63 | 51 | 17 | 32 | 3.4 | 110 |

TABLE IVB

| Exp. No. | Sample No. | GPC Analysis APP Mw × 10³ Peak | $\overline{Mw}$ | $\overline{Mn}$ | $\overline{Mw}/\overline{Mn}$ | IR Analysis Butadiene part Vinyl | CIS | Trans | Styrene | Mooney |
|---|---|---|---|---|---|---|---|---|---|---|
| 21 | WB236-237 | 500 | 503.3 | 323.2 | 1.56 | 48 | 17 | 35 | 25.4 | 107 |
| 22 | WB242/243 | 440 | 433.3 | 282.7 | 1.53 | 47 | 17 | 36 | 26.1 | 114 |
| 23 | WB244-245 | 470 | 473.9 | 285.0 | 1.66 | 48 | 17 | 35 | 24.7 | 110 |
| 24 | WB246-247 | 500 | 498.5 | 318.0 | 1.57 | 47 | 19 | 34 | 24.6 | 104 |

TABLE V B

| Exp. No. (& Sample No.) | Initial part of polymer ("Begin tail") Amount on total polymer % | Styrene/butadiene ratio W/W | Main Chain Amount on total polymer % | Styrene/butadiene ratio W/W | Overall Styrene content % (IR Analysis) |
|---|---|---|---|---|---|
| 26(D292/293) | 5 | 90/10 | 95 | 19.5/80.5 | 23.5 |
| 27(PS241) | 5 | 40/60 | 95 | 22.1/77.9 | 23.2 |
| 28(PS242) | 2 | 40/60 | 98 | 22.7/77.3 | 23.1 |

CHARACTERISTICS OF SBR POLYMERS

| Exp. No. (& Sample No.) | Structure of butadiene portion of copolymer 1,2 | cis 1,4 | Trans 1,4 | GPC Analysis App. peak MW × 10³ BC | CE | $\overline{M}_W$ | $\overline{M}_N$ | MW/Mn | Mooney Viscosity |
|---|---|---|---|---|---|---|---|---|---|
| 26(D292/293) | 50.9 | 13.6 | 35.5 | 230 | 76 | 535 | 271 | 1.97 | 74 |
| 27(PS241) | 50.6 | 15.7 | 33.7 | 219 | 66 | 524 | 262 | 2.00 | 66 |
| 28(PS242) | 52.5 | 13.6 | 33.9 | 211 | 70 | 555 | 262 | 2.12 | 65 |

By use of the reaction of the various processes of the Experiments 11 et seq there have been produced graphs showing a plot of % differential styrene in the copolymer part of the molecule against % monomer conversion (which corresponds to % molecular size of the polymer molecules). Thus, for example, Prints 11–13 do not show the polystyrene block present at an end of the molecule. These graphs are included in the accompanying drawings and bear numbers corresponding to the numbers of the Experiments; for example "Exp.11/12" refers to the structure of the products of Experiments 11 and 12 and "Exp. 13" refers to the product of Experiment 13.

Referring to print "Exp. 17" of the accompanying drawings by way of example, it will be seen that the molecule of the polymer of Experiment 17 can be regarded as being composed of two portions: a first or main chain portion comprising about 90% of the molecule, over which the styrene content rises from 17% at one end (the "begin" end) of the molecule to 30% at the end of said first portion, and a second or end portion comprising the remaining 10% or thereabouts of the molecule. This last-mentioned portion has a styrene-rich component or portion in which the styrene content rises rapidly from about 30% at the 90% monomer conversion mark towards 100%, and the styrene content at the outer end of the end portion (or later end in terms of the production of the polymer) is 97%.

The various values for the sizes of portions of the molecule and the differential styrene contents thereof can be obtained by reading off the respective print.

On each of the prints there has been marked a first (threshold) value (T) at one end of a portion of the graph corresponding to 5% of the monomer conversion, and a second (maximum) value (M) within said 5% portion. In all the prints except those numbered 16C, 26, 27 and 28 said 5% portion extends from 0% to 5% or from 95% to 100% monomer conversion; in Print 16C said 5% portion extends from 3 to 8% monomer conversion; in Print 26 it extends from 2½% to 7½%; and in Print 28 it extends from ½ to 5½%. In Print 27 only a 2½% portion of the monomer conversion is shown. In all prints except Print 27 the respective terminal 5% portion of monomer conversion has been bisected to divide said portion into two 2½% zones of monomer conversion, which illustrates the change in differential styrene content over those two zones. In all instances (including Print 27) the styrene content rises by more than 14 percentage points.

It is to be noted that the prints show differential styrene content of copolymer only; where there is a polystyrene component it is not shown on the print. In Print 16C the horizontal line at 94% styrene content refers to copolymer.

As is made clear from the prints, reference above to certain percentage proportions of the "length of the molecule" are derived from the corresponding figures for monomer conversion, and it is not to be inferred that the molecules of any given polymer are all of the same length.

It will be seen from the tables that the vinyl content (that is the amount of the butadiene component of the polymer that has polymerised at the 1,2-positions) is in each case 30% or more and that most of the values lie in the range 40 to 50%, especially 45 to 50%. The styrene content of most of the polymers is in the range 20 to 30%, especially 25 to 30%, though some values are about 10% or less and some values above 50%. In general, most values are at least 30%.

Each of the copolymers has been formulated in an elastomer composition having in each case the following constitution.

|  | Parts by weight |
|---|---|
| Copolymer | 100 |
| Sulphur | 1.75 |
| Accelerator - CBS (cyclohexylbenzthiazyl sulphenamide) | 1 |
| Carbon black N 375 | 50 |
| Antioxidant BLE 75 | 2 |
| Zinc oxide | 3 |
| Stearic acid | 1 |

The elastomeric compositions were vulcanised at 140° C. for 60 minutes in a steam autoclave, using a 15 minute rise to temperature.

The elastomeric compositions have been tested to assess their wet grip properties on a road surface. Each of those compositions was used as the tread compound of model tires of size 2.25-8 (dimensions in inches). These model tires were subjected to the following tests to determine wet grip. Grip on a Delugrip road surface (Delugrip is a Registered Trade Mark) was measured using the variable speed internal drum machine (VSIDM) described in a paper by G. Lees and A. R. Williams in Journal of the Institute of the Rubber Industry. Vol. 8, No. 3, June 1974. Measurements of the wet grip were made for locked wheel sliding friction.

Rolling resistance was measured on the rotary power loss machine.

The results obtained are shown in Table D below.

TABLE D

| Experiment No. | Wet grip - (sliding friction) | Rolling resistance (Calculated according to Equation 3.1) |
|---|---|---|
| Comparison |  |  |
| S-1502 | 100 | 100 |
| Invention |  |  |
| 11 | 118 | 99 |
| 12 | 118 | 99 |
| 13 | 112 | 100 |
| 14 | — | — |
| 14A | 115 | 102 |
| 15 | 101 | 98 |
| 16 | 100 | 99 |
| 16B | 108 | 101 |
| 16C | 110 | 103 |
| 17 | 116 | 99 |
| 18 | 106 | 97 |
| 19 | 101 | 98 |
| 20 | 94 | 97 |
| 21 | 119 | 98 |
| 22 | 119 | 100 |
| 23 | 117 | 99 |
| 24 | 113 | 98 |
| 26 | 113 | 95 |
| 27 | 111 | 93 |
| 28 | 110 | 96 |

It will be seen from Table D that the tires tested have a good combination of wet grip and rolling resistance. It is believed that the begin or tail end portion or portions of the polymer molecule having the styrene-rich component makes a major contribution to the good wet grip and that the remainder of the molecule having a substantial vinyl content and free from a styrene-rich component makes a major contribution to the good rolling resistance.

The invention is further illustrated by the following Experiments 29 to 34, in which, unless stated otherwise, the proportion of ingredients in the compositions is given in parts by weight.

The compositions of Experiments 29 to 31 include as their polymer ingredient solution styrene-butadiene copolymers referred to below as copolymers J and K, respectively. The bound styrene content, vinyl content (expressed as a percentage by weight of the butadiene content of the copolymer) and molecular weight are shown in the following table, and both copolymers are polymers which have a linear structure.

| Copolymer | Styrene Content (% IR) | Vinyl Content (% IR) | Molecular Weight × $10^3$ |
|---|---|---|---|
| J | 23 | 33 | 450 |
| K | 24.8 | 30 | 429 |

That portion of the copolymers in which the butadiene has reacted by "head-to-tail" 1,4 polymerisation has been found largely to have a trans configuration. The molecular weights referred to in the table are peak molecular weights obtained by gel permeation chromatography using polystyrene as a comparative standard.

Elastomer compositions of the invention, suitable for use as tire treads, have been obtained by blending together the following ingredients and vulcanising for 40 minutes at 140° C. in a steam autoclave.

| Ingredients | Experiment No. | | |
|---|---|---|---|
|  | 29 | 30 | 31 |
| Copolymer J | 100.00 |  |  |
| Copolymer K |  | 100.00 | 72.50 |
| Dutrex 729 Oil |  |  | 27.50 |
| Sulphur | 1.75 | 1.75 | 1.75 |
| Stearic acid | 1.00 | 1.00 | 1.00 |
| Zinc Oxide | 3.00 | 3.00 | 3.00 |
| 75% BLE | 2.00 | 2.00 | 2.00 |
| C.B.S. accelerator | 1.00 | 1.00 | — |
| M.B.S. accelerator | — | — | 1.00 |
| N 375 carbon black | 50.00 | 50.00 | 50.00 |

The compositions of Experiments 32 to 34 each contains as its polymer ingredient a solution styrene-butadiene copolymer referred to below as copolymer A, B and C respectively. The bound styrene content, vinyl content (expressed as a percentage by weight of the butadiene content of the copolymer) and molecular weight are shown in the following Table, and they are all polymers having a linear structure.

| Copolymer | Styrene Content (% IR) | Vinyl Content (IR) | Molecular Weight × $10^3$ |
|---|---|---|---|
| A | 22 | 67 | 480 |
| B | 25 | 52 | 480 |
| C | 24.7 | 47 | 427 |

That portion of the copolymers in which the butadiene has reacted by "head-to-tail" 1,4 polymerisation has been found largely to have a trans configuration. The molecular weights referred to in the table are peak molecular weights obtained by gel permeation chromatography using polystyrene as a comparative standard.

Three elastomer compositions of the invention, suitable for use as tire treads, have been obtained by blending together the following ingredients and vulcanising for 40minutes at 140° C., in a steam autoclave.

| Ingredients | Experiment No. | | |
|---|---|---|---|
| | 32 | 33 | 34 |
| Copolymer A | 100.00 | — | — |
| Copolymer B | — | 100.00 | — |
| Copolymer C | — | — | 100.00 |
| Sulphur | 1.75 | 1.75 | 1.75 |
| Stearic acid | 1.00 | 1.00 | 1.00 |
| Zinc oxide | 3.00 | 3.00 | 3.00 |
| 75% BLE | 2.00 | 2.00 | 2.00 |
| C.B.S. accelerator | 1.00 | 1.00 | — |
| M.B.S. accelerator | — | — | 1.00 |
| N 375 carbon black | 50.00 | 50.00 | 50.00 |

The compositions of Experiments 29 to 34 have been found to have a desirable combination of wet grip and rolling resistance properties as shown in Table E.

TABLE E

| Experiment No. | Wet grip - sliding friction | Rolling resistance (calculated according to Equation 3.1) |
|---|---|---|
| S-1502 (comparison) | 100 | 100 |
| 29 | 110 | 93 |
| 30 | 111 | 96 |
| 31 | 123 | 110 |
| 32 | 110 | 100 |
| 33 | 118 | 99 |
| 34 | 116 | 99 |

EXPERIMENTS 35, 36 AND 37

Several other copolymers have been produced according to the conditions referred to in Table VIA, and their properties are given in Table VIB. In Experiments 35 and 36 isoprene is used in a way such that it polymerises substantially entirely in the "tail" portion of the copolymer—an example of the use with butadiene of a second conjugated diene hydrocarbon.

The copolymers of Experiments 35 and 36 are begin tail polymers and the nature of the tail is determined largely by the batchwise charge. In Experiment 35 the diene component in the batchwise charge is half butadiene and half isoprene leading to a tail having a substantial isoprene content; in Experiment 36 the batchwise diene component is wholly isoprene leading to a tail substantially without butadiene.

In Experiment 37, as in Experiments 35 and 36, addition of monomers after the start of the reaction is carried out continuously.

TABLE VIA

Solution SBR - Polymerisation procedure

| | |
|---|---|
| Polymer batch size: 40.0 kg | Polymerisation temp: 55° C.-60° C. |
| Solvent: cyclohexane | Coupling agent: dimethyl adipate |
| Final solids content: 20.0% w | Coupling time: 15 min. |
| Ortho dimethoxybenzene: 450 ppm | Total polymerisation time: 120 min. |
| s-BuLi: 0.267 mol (kinetic MW, before coupling: 150.000) | Reactor - R 260/3501 nominal capacity |

| | Sample number | | |
|---|---|---|---|
| Conditions | 10802 | 10803 | 10804 |
| | 35 | 36 | 37 |
| Batchwise charged | | | |
| Butadiene, kg | 0.077 | — | 0.45 |
| Isoprene, kg | 0.077 | 0.154 | — |
| Styrene, kg | 0.92 | 0.92 | 2.76 |
| 1st Continuous addition | | | |
| Butadiene, kg | 27.57 | — | 27.27 |
| Isoprene, kg | — | 6.89 | — |
| Styrene, kg | 8.28 | 2.07 | 6.44 |
| time of addition, min. | 80 | 20 | 80 |
| 2nd Continuous addition | | | |
| Butadiene, kg | 3.08 | 20.68 | 3.08 |
| Isoprene, kg | — | — | — |
| Styrene, kg | — | 6.21 | — |
| time of addition, min. | 20 | 60 | 20 |
| 3rd Continuous addition | | | |
| Butadiene, kg, in 20 min. | — | 3.08 | — |

TABLE VIB

| Exp. No. | Sample No. | GPC - analysis | | | | | | Infrared Analysis | | | | Mooney |
|---|---|---|---|---|---|---|---|---|---|---|---|---|
| | | app. peak BC | MW × 10⁻³ AC | CE, % | $\overline{M}_w \times 10^{-3}$ | $\overline{M}_n \times 10^{-3}$ | Q | Styrene, % | Butadiene portion | | | |
| | | | | | | | | | 1.2 % | 1.4 trans % | 1.4 cis % | |
| 35 | 10802 | 220 | 585 | 57 | 402 | 215 | 1.88 | 23.9 | 47.7 | 29.7 | 22.6 | 44 |
| 36 | 10803 | 370 | 1100 | 51 | 506 | 260 | 1.96 | 24.2 | 40.5 | 26.4 | 33.2 | 73 |
| 37 | 10804 | 235 | 600 | 56 | 420 | 250 | 1.68 | 25.4 | 48.3 | 28.8 | 23.0 | 60 |

The copolymers of Experiments 35–37 have been used, as the tread portion of full size tires (155 SR13 SP4), and their wet grip and rolling resistance has been determined as follows:

Wet grip: using the internal drum testing facility at University of Karlsruhe

Rolling resistance: using the rotary power loss machine referred to above.

The results obtained were as shown in Table F below.

TABLE F

| Exp. No. | Compound polymer | Wet Grip Rating | | | Rolling Resistance (calculated according to Equation 3.1) |
|---|---|---|---|---|---|
| | | Peak | Cornering | Mean | |
| Comparisons: | | | | | |
| — | S-1502 | 100 | 100 | 100 | 100 |
| — | S-1712 | 108 | 104 | 106 | 103 |
| — | OEP/LTP | 107 | 100 | 103 | 115 |
| 35 | 10802 | 113 | 107 | 110 | 101 |
| 36 | 10803 | 120 | 116 | 118 | 99 |
| 37 | 10804 | 117 | 120 | 118 | 98 |

Having now described our invention what we claim is:

1. A copolymer obtained by coupling together two or more component copolymers, each of said component copolymers, which can be the same or different, being an elastomeric copolymer of an aromatic vinyl compound and a conjugated diene, suitable for use in the tread portion of a pneumatic tire, said aromatic vinyl compound being a compound selected from the group consisting of styrene, 1-vinyl naphthalene, 3,5-diethylstyrene, 4-n-propylstyrene, 2,4,6-trimethyl styrene, 4-phenyl styrene, 4-p-tolystyrene 3,5-diphenylstyrene, 3-ethyl-1-vinylnaphthalene, and 8-phenyl-1-vinyl naphthalene, said conjugated diene being a compound selected from the group consisting of 1,3 butadiene, 2-methyl-1, 3-butadiene (isoprene), 1,3-pentadienes (piperylenes), 2,3-dimethyl-1, 3-butadiene, 2-methyl-1,3-pentadiene, 2,3-dimethyl-1, 3-pentadiene, and 2-phenyl butadiene, said elastomeric copolymer having a vinyl content of at least 30% by weight and having a differential content of the aromatic vinyl compound such that in at least one of its end portions said differential content changes in a portion of not more than 5% of the copolymer chain (as determined by monomer conversion) from a first value to a second value, said second value being not more than 98% and being at least 25 percentage points greater than said first value; and said portion lies within a terminal 10% portion of the copolymer chain (as determined by monomer conversion).

2. A copolymer obtained by coupling together two or more component copolymers, each of said component copolymers, which can be the same or different, being an elastomeric copolymer of an aromatic vinyl compound and a conjugated diene, suitable for use in the tread portion of a pneumatic tire, said aromatic vinyl compound being a compound selected from the group consisting of styrene, 1-vinyl naphthalene, 3,5-diethylstyrene, 4-n-propylstyrene, 2,4,6-trimethyl styrene, 4-phenyl styrene, 4-p-tolystyrene 3,5-diphenylstyrene, 3-ethyl-1-vinylnaphthalene, and 8-phenyl-1-vinyl naphthalene, said conjugated diene being a compound selected from the group consisting of 1,3 butadiene, 2-methyl-1,3 butadiene (isoprene), 1,3-pentadienes (piperylenes), 2,3-dimethyl-1,3-butadiene, 2-methyl-1,3-pentadiene, 2,3-dimethyl-1,3-pentadiene, and 2-phenyl butadiene, said elastomeric copolymer having a vinyl content of at least 30% by weight and having a differential content of the aromatic vinyl compound such that in at least one of its end portions said differential content changes in a zone of not more than $2\frac{1}{2}\%$ of the copolymer chain (as determined by monomer conversion) from a first value to a second value, said second value being at least 14 percentage points greater than said first value; and said zone lies within a terminal 10% portion of the copolymer chain (as determined by monomer conversion).

3. A copolymer according to either claim 1 or 2, in which the coupled two or more copolymers are vulcanized.

4. A copolymer according to claim 1 or 2, in which said coupling is effected using a tetra-functional coupling agent.

5. A coupled copolymer obtained by coupling together two or more copolymers, each of said copolymers, which can be the same or different, being an elastomeric copolymer of an aromatic vinyl compound and a conjugated diene, suitable for use in the tread portion of a pneumatic tire, said aromatic vinyl compound being a compound selected from the group consisting of styrene, 1-vinyl naphthalene, 3,5-diethylstyrene, 4-n-propylstyrene, 2,4,6-trimethyl styrene, 4-phenyl styrene, 4-p-tolystyrene 3,5-diphenylstyrene, 3-ethyl-1-vinylnaphthalene, and 8-phenyl-1-vinyl naphthalene, said conjugated diene being a compound selected from the group consisting of 1,3 butadiene, 2-methyl-1, 3-butadiene (isoprene),1,3-pentadienes, (piperylenes),2,3-dimethyl-1, 3-butadiene, 2-methyl-1,3-pentadiene, 2,3-dimethyl-1, 3-pentadiene, and 2-phenyl butadiene, said elastomeric copolymer having a vinyl content of at least 30% by weight and having a differential content of the aromatic vinyl compound such that in at least one of its end portions said differential content shows a sharp and substantial increase in the direction of the outer extremity of said end portion, the content of said aromatic vinyl compound in at least one of the end portions of said elastomeric copolymer changing from a first value to a second value, the second value being less than 100% in which said coupling has been effected at a portion of each of the elastomeric copolymers of aromatic vinyl compound and conjugated diene other than at said at least one end portion.

6. A copolymer according to claim 5, in which said aromatic vinyl compound is styrene.

7. A copolymer according to claim 5 or 6 in which said diene is butadiene.

8. A copolymer according to claim 5 or 6, in which said diene is isoprene.

9. A copolymer according to claim 5, in which the copolymer is a styrene-butadiene copolymer.

10. A coupled copolymer according to claim 5, in which said elastomeric copolymer is a styrene-butadiene copolymer, whose percentage differential styrene content in said at least one end portion changes in a portion of not more than 5% of the copolymer chain (as determined by monomer conversion) from a first value to a second value, said second value being at least 25 percentage points greater than said first value; and said portion lies within a terminal 10% portion of the copolymer chain (as determined by monomer conversion).

11. A copolymer according to claim 10, in which said 5% portion is a terminal portion of the copolymer chain.

12. A copolymer according to claim 10 or 11, in which the percentage differential styrene content changes in a zone of not more than $2\frac{1}{2}\%$ of the copolymer chain (as determined by monomer conversion) from a first value to a second value, said second value being at least 14 percentage points greater than said first value; and said zone lies within a terminal 10% portion of the copolymer chain (as determined by monomer conversion).

13. A copolymer according to claim 10, in which said second value is at 0% monomer conversion.

14. A copolymer according to claim 5, which consists substantially wholly of styrene and butadiene.

15. A copolymer according to claim 5, in which the bound styrene content of the copolymer is at least 10% by weight.

16. A copolymer according to claim 5, in which said vinyl content is in the range from 30% to 60% by weight.

17. A copolymer according to claim 5, which is linear.

* * * * *